United States Patent
Dossary et al.

(10) Patent No.: US 11,662,492 B2
(45) Date of Patent: May 30, 2023

(54) SEISMIC RANDOM NOISE ATTENUATION

(71) Applicant: Saudi Arabian Oil Company, Dhahran (SA)

(72) Inventors: Saleh A. Dossary, Dammam (SA); Jiaxiang Ren, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 989 days.

(21) Appl. No.: 16/170,900

(22) Filed: Oct. 25, 2018

(65) Prior Publication Data

US 2020/0132872 A1    Apr. 30, 2020

(51) Int. Cl.
  *G06T 1/20* (2006.01)
  *G01V 1/36* (2006.01)
  *G01V 1/34* (2006.01)

(52) U.S. Cl.
  CPC .............. *G01V 1/364* (2013.01); *G01V 1/345* (2013.01); *G06T 1/20* (2013.01); *G01V 2210/3248* (2013.01); *G01V 2210/74* (2013.01); *G06T 2200/04* (2013.01)

(58) Field of Classification Search
  CPC .......... G01V 1/345; G01V 1/36; G01V 1/364; G01V 2210/32; G01V 2210/3248; G01V 2210/74; G06T 1/20; G06T 2200/04
  See application file for complete search history.

(56) References Cited

U.S. PATENT DOCUMENTS

| | | | |
|---|---|---|---|
| 5,594,807 A * | 1/1997 | Liu | G06T 5/008 382/128 |
| 6,961,283 B2 | 11/2005 | Kappius et al. | |
| 7,366,054 B1 | 4/2008 | Wood | |
| 8,170,288 B2 | 5/2012 | Wang et al. | |
| 8,705,315 B2 | 4/2014 | Al-Dossary et al. | |
| 8,838,392 B2 | 9/2014 | Halliday et al. | |
| 8,855,440 B2 | 10/2014 | Al-Dossary et al. | |
| 8,965,706 B2 | 2/2015 | Ji | |
| 8,983,779 B2 | 3/2015 | Liu et al. | |
| 9,002,651 B2 | 4/2015 | Liu et al. | |

(Continued)

FOREIGN PATENT DOCUMENTS

| | | |
|---|---|---|
| EP | 2784552 | 10/2014 |
| GB | 2474303 | 4/2011 |

(Continued)

OTHER PUBLICATIONS

Maier et al. "Three-dimensional anisotropic adaptive filtering of projection data for noise reduction in cone beam CT." Medical Physics 38. Nov. 2011. (Year: 2011).*

(Continued)

*Primary Examiner* — Hovhannes Baghdasaryan

(74) *Attorney, Agent, or Firm* — Fish & Richardson P.C.

(57) ABSTRACT

Seismic image processing including filtering a three-dimensional (3D) seismic image for random noise attenuation via multiple processors. The filtering includes receiving a 3D image cube of seismic image data, decomposing the 3D image cube into 3D sub-cubes for parallel computation on the multiple processors, designing and applying a two-dimensional (2D) adaptive filter for image points on 2D image slices of the 3D sub-cubes via the multiple processors to give filtered 3D sub-cubes, and summing the filtered 3D sub-cubes to give a filtered 3D image cube.

21 Claims, 10 Drawing Sheets

(56) References Cited

U.S. PATENT DOCUMENTS

| | | |
|---|---|---|
| 9,645,298 B2 | 5/2017 | Fu |
| 2011/0060528 A1 | 3/2011 | Ozbek et al. |
| 2014/0088879 A1 | 3/2014 | Hennefent et al. |
| 2014/0288842 A1 | 9/2014 | Maraschini |
| 2015/0066375 A1 | 3/2015 | Liu et al. |
| 2017/0219734 A1 | 8/2017 | Duval et al. |
| 2018/0259664 A1* | 9/2018 | Li .................. G01V 1/364 |
| 2020/0257012 A1* | 8/2020 | Aarre .................. G01V 1/366 |

FOREIGN PATENT DOCUMENTS

| | | |
|---|---|---|
| WO | WO 2012087632 | 6/2012 |
| WO | WO 2017062390 | 4/2017 |

OTHER PUBLICATIONS

Ahn et al. "Adaptive Template Filtering for Signal-to-Noise Ratio Enhancement in Magnetic Resonance Imaging." IEEE Transactions On Medical Imaging, vol. 18, No. 6, Jun. 1999 (Year: 1999).*

Schaeffter et al. "Real-Time Adaptive Filtering for Projection Reconstruction MR Fluoroscopy" IEEE Transactions On Medical Imaging, vol. 22, No. 1, Jan. 2003 (Year: 2003).*

Kubo et al. "Use of 3D Adaptive Raw-Data Filter in CT of the Lung: Effect on Radiation Dose Reduction." AJR:191, Oct. 2008 (Year: 2008).*

Liu (Adaptive prediction filtering in t-x-y domain for random noise attenuation using regularized nonstationary autoregression), Geophysics, vol. 80, No. 1 (Jan.-Feb. 2015); p. V13-V21, 15 Figs. 10.1190/GEO2014-0011.1) (Year: 2015).*

GCC Examination Report in GCC Appln. No. GC 2019-38521, dated Nov. 11, 2020, 4 pages.

Abma and Claerbout, "Lateral prediction for noise attenuation by t-x and f-x techniques," Geophysics vol. 60, Issue 6, Nov. 1995, 10 pages.

Buades et al., "A non-local algorithm for image denoising," Proceedings of the Computer Vison and Pattern Recognition, (CVPP'05), vol. 2, Jun. 20-25, 2005, 6 pages.

Criminish et al., "Region filling and object removal by exemplar-based image inpainting," IEEE Transaction on Image Processing, vol. 13, No. 9, Sep. 2004, 13 pages.

Efros and Leung, "Texture synthesis by non-parametric sampling," Proceedings of the International Conference on Computer Vision (ICCV'99), Sep. 1999, 6 pages.

Gasser et al., "Residual variance and residual pattern in nonlinerar regression," Biometrika vol. 73, No. 3, Dec. 1986, 10 pages.

Gulunay, "Noncasual spatial prediction filtering for random noise reduction on 3-D poststack data," Geophysics vol. 65, No. 5, Sep. 2000, 13 pages.

Hale, "Seamless local prediction filtering," Center for Wave Phenomena Report, 2006, 8 pages.

Kervrann and Boulanger, "Local adaptive to variable smoothness for exemplar-base image regularization and representation," International Journal of Computer Vision, vol. 79, Issue 1, Aug. 2008, 36 pages.

Kervrann, "An adaptive window approach for image smoothing and structures preserving," Proceedings of the European Conference on Computer Vision (ECCV'06), vol. 4, May 2004, 12 pages.

Soubaras, "Prestack random and impulsive noise attenuation by f-x projection filtering," SEG Expanded Abstract, SEG Annual Meeting, Oct. 8-13, 1995, 4 pages.

International Search Report and Written Opinion issued in International Application No. PCT/US2019/057564 dated Mar. 30, 2020, 14 pages.

GCC Examination Report in GCC Appln. No. GC 2019-38521, dated Sep. 26, 2021, 4 pages.

* cited by examiner

SEISMIC RANDOM NOISE ATTENUATION

TECHNICAL FIELD

This disclosure relates to seismic random noise attenuation by a local adaptive filter.

BACKGROUND

Geophysicists rely on seismic reflection techniques to evaluate and interpret the structures of subsurface formations in order to find the most likely locations of hydrocarbon deposits. The energy of a reflected wave from a subsurface point is originally recorded by a number of seismic traces that correspond to different shot-receiver combinations. This type of records may be labeled as pre-stack data. Rock property information can be extracted by analyzing the amplitude variation among the pre-stack seismic traces that correspond to different traveling paths.

A set of processing steps can be applied to the pre-stack records to obtain the so-called post-stack image. The processing steps can include statics correction, noise reduction, deconvolution, velocity analysis, normal-moveout or migration, and stacking, and the like. The post-stack image can be used to delineate the subsurface horizons and geological structures such as edges, faults, channels, and so on.

During seismic data acquisition, the reflection signal is interfered by incoherent or random noises from a variety of environment and instrument sources. High-amplitude random noises can be retained on post-stack image, regardless of the processing procedures applied. The existence of random noises degrades the visibility and interpretability of both pre-stack and post-stack data. Therefore, random noise attenuation is beneficial in seismic data processing, and various prior methods exist for such random noise attenuation.

SUMMARY

An aspect relates to a method of seismic image processing including filtering a three-dimensional (3D) seismic image for random noise attenuation via a distributed computing system having multiple processors. The filtering includes receiving a 3D image cube of seismic image data of the 3D seismic image, decomposing the 3D image cube into 3D sub-cubes for parallel computation on the multiple processors, applying a two-dimensional (2D) adaptive filter to 2D image slices of the 3D sub-cubes via the multiple processors to give filtered 3D sub-cubes, and summing the filtered 3D sub-cubes to give a filtered 3D image cube.

Another aspect relates to a method of filtering, via a distributed computing system, a 3D seismic image for random noise attenuation. The method includes receiving a 3D image cube of seismic data of the 3D seismic image wherein the 3D seismic image includes input data that is a 3D ensemble of seismic traces. The method includes decomposing the 3D image cube into 3D sub-cubes for parallel computation on multiple processors of the distributed computing system, and applying a 2D adaptive filter to 2D image slices of the 3D sub-cubes to give filtered 3D sub-cubes. Further, the method includes summing the filtered 3D sub-cubes to give a filtered 3D image cube, wherein the filtered 3D image cube is the 3D image cube minus random noise.

Yet another aspect relates to a distributed computing system including multiple processors for filtering 3D seismic image data to suppress random noise. The distributed computing system includes a random noise attenuator to: decompose a 3D image cube of the 3D seismic image data into 3D sub-cubes for parallel computation on the multiple processors; apply a 2D adaptive filter to 2D image slices of the 3D sub-cubes via the multiple processors to give filtered 3D sub-cubes; and sum the filtered 3D sub-cubes to give a filtered 3D image cube.

Yet another aspect relates to a non-transitory, computer-readable medium storing instructions executable by a processor of a computing device to filter 3D seismic image data for random noise attenuation by applying a 2D adaptive filter to 2D image spaces of a 3D seismic image cube of the 3D seismic image data, wherein the 2D adaptive filter is a 2D local adaptive filter iteratively designed in application based on local data structure.

The details of one or more implementations are set forth in the accompanying drawings and the description below. Other features and advantages will be apparent from the description and drawings, and from the claims.

DETAILED DESCRIPTION

Figure 1:
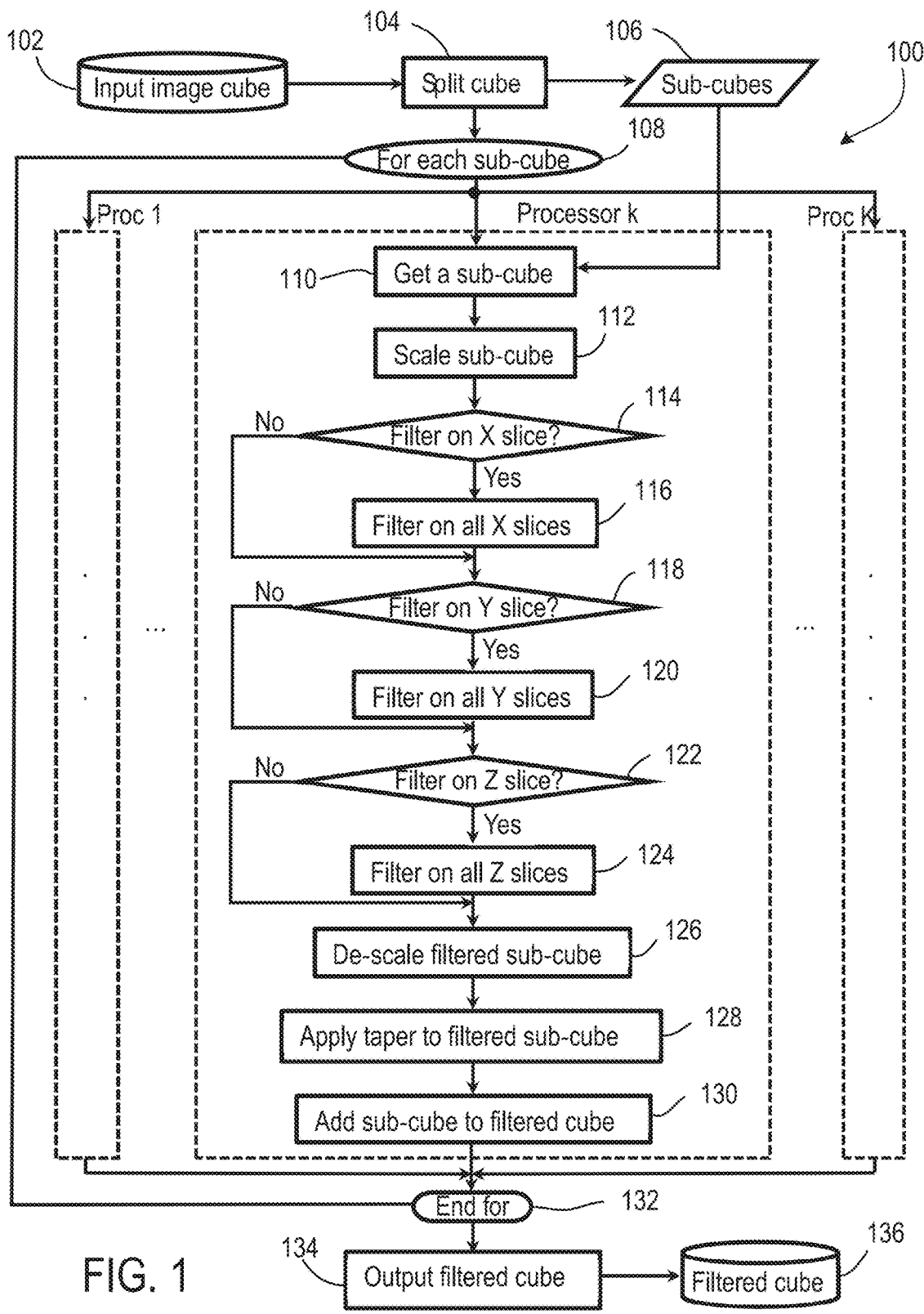
FIG. 1 is a block flow diagram of a method of filtering a three-dimensional (3D) seismic image volume for random noise attenuation.

Random noise is generally the most-encountered artifacts in a seismic image and can degrade image visibility and interpretability. Therefore, attenuating random noise can be an advantageous task in seismic data processing. A goal of some examples of the present techniques is to apply a local adaptive filter to attenuate random noise for three dimensional (3D) seismic data, either pre-stack or post-stack. These examples may run on a distributed computing system or multi-processor computer such as a multi-processor Linux® machine, and be compliant with various seismic data processing systems including the Echos® seismic data processing system. Of course, the present techniques are not limited to a particular configuration of computer or to a seismic data processing system. The techniques relate generally to processing 3D pre-stack and post-stack seismic image data, and more particularly, to attenuating random noise by applying a local adaptive filter to improve the visibility and interpretability of coherent seismic events.

Implementations of the present disclosure relate to random noise attenuation in 3D seismic data via a two dimensional (2D) local adaptive filter. The 2D local adaptive filter as implemented may be a separate (differently configured or designed) respective filter employed for each considered image point, and with the filter configuration based on the local data structure. The support size or filter length may be correlative with local image statistics. In this context, local image statistics used to decide the support size (filter length) may be the local variance that measures local smoothness. The support size may be decided by comparing the local variance with estimate error between two successive iterations of the iterative filtering process.

This local adaptive filter can be applied to image slices, successively along the three dimensions of an image volume, in order to accommodate for the 2D form of the filter and the 3D arrangement of seismic data. To achieve parallelization, a 3D image volume may be split into a series of overlapped sub-cubes which are distributed to different hardware processors in a parallel computation environment. This domain decomposition strategy, together with the strategy for image balancing inside a sub-cube, can improve data stationarity that may benefit the suppression of random noise while preserving original features of seismic events. Image balancing may make the image points in a given image space have a similar amplitude (intensity) level.

Methods for random noise attenuation in seismic image processing can include f-k filtering, polynomial fitting, wavelet transform, prediction filtering, and so forth. Each method may have advantages as well as drawbacks and applicable conditions.

In prediction filtering for an image point being filtered, the filter is designed for and applied to the input image points inside a support area (window) around the filtered point. In other words, the image amplitude for the point being filtered is the average of image amplitudes in the support, weighted by the filter coefficients. A reason why the prediction filtering method may be beneficial is the filter locality. The filter locality in the prediction filtering context means that a specific filter is design for any image point, and also that the filter design is based on the local input data. The prediction filter thus designed is variable with image locations and adaptive to the local data characteristics. Therefore, the prediction filter technique is able to pass the part of signals that is predictable with the surrounding images, and to reject the unpredictable part. Typically, the desired filter locality is accounted for by splitting the image space into a series of sub-windows. Each sub-window is processed independently and then the filtered results from the sub-windows are combined to get the final result for the whole image space. Therefore, this prediction filter is local only in the sense of sub-windows.

To achieve better locality in designing and applying the prediction filtering, the prediction filtering may include computation of local auto-correlations. This method may be "implicit" meaning that a linear system of equations is solved to obtain the filter coefficients at each image point. Yet, there is still a nonlocal component in this method and other prediction filtering methods. That is, the support size (filter length) is constant and not adjustable to cope with image inhomogeneity.

In general, the adaptive filtering methods are expected to be local in the sense of coping with the local data heterogeneity. However, the locality of the adaptive filtering methods in seismic image processing may be piecewise or limited to a given window. On the other hand, enhanced methods with true locality are costly to implement due to the necessity to solve the system of equations. They also use a fixed support size (filter length) for an entire image space, which may cause over-smoothed image and unnecessary computation cost.

In computer vision, a filtering method for image restoration may be adaptive to the local data statistics for both the computation of filter coefficients and the determination of support sizes. The method may be "explicit." The filter coefficient assigned to a support point is decided by directly comparing two image patches centered at the support point and the point being filtered. If the two patches are similar, a larger weight is assigned to the corresponding support point. The locally variable support size is achieved by an iterative filtering process that has an increasing support size with iterations. At any iteration, the support size and filtered result for an image point can be frozen based on the balanced estimate accuracy and local smoothness. The frozen support size is pointwise and adaptive to the local image heterogeneity. The local adaptive filter developed in the field of computer vision overcomes drawbacks. However, the technique does not consider the characteristics of seismic data, for example, the polarity and variance distribution. Also, filtering in computer vision gives no indication at all, much less a strategy, to apply the computer-vision 2D filter to 3D data. The field of computer vision plainly does not provide a strategy or approach to employ this 2D filter to the typical 3D seismic data of large sizes under parallel computation environment in any sense, much less efficiently or effectively.

In contrast, as mentioned, embodiments of the present techniques employ a 2D adaptive filtering for random noise attenuation in seismic image processing. The filter may incorporate the information of seismic polarity and variances at patch centers, resulting in some cases in improved accuracy and efficiency for the filter. The efficiency for examples of the present filter may be further improved in certain instances by implementations employing or relying on symmetry of the filter. To handle 3D seismic data, the 2D adaptive filter is applied to the image slices along one or more of the three image dimensions. The challenges for memory demands in processing may be handled via parallel computation and with respect to data stationarity by decomposing a relatively large data volume into sub-cubes.

In summary, some aspects of the present disclosure are directed to a 2D local adaptive filter for random noise attenuation in 3D seismic data processing. In operation, a separate (respective) filter is designed and employed for an image point based on the local data structure, characteristics of the seismic data, and symmetry of the filter. The 2D filter is applied to image slices selected from a 3D data volume. The support size (filter length) is variable based on local image statistics. The variable support size may be achieved by an iterative but locally stoppable filtering process with an increasing support size against iterations. To achieve parallelization, a 3D image volume may be split into the overlapped sub-cubes which are distributed to different processors across one or more devices. This domain decomposition strategy, together with the image balancing applied inside a sub-cube, can also improve data stationarity. In a sub-cube, the local adaptive filter is applied to image slices successively along the three dimensions of an image volume to accommodate for the 2D nature of the filter and to increase efficiency. Testing with examples of the present techniques for both post-stack and pre-stack seismic data show suppression of random noise while preserving original features of seismic events.

In certain embodiments, a sub-cube is a portion of the whole image cube to be filtered. Sub-cubes may result from splitting an input image cube, with each sub-cube sharing overlapped zones with surrounding sub-cubes. Each sub-cube is typically filtered separately. A final or combined result may be obtained by combining the filtered results from all sub-cubes. A taper can be applied in the overlapped zone to promote a smoothed result near the sub-cube boundaries after combining the sub-cubes.

The "overlapped" sub-cubes may mean that the sub-cubes are not only connected to each other but also share common zones at the boundaries. An overlapped zone may exist on each side of a sub-cube. In the overlapped zone, a linearly decaying taper may be applied to each of the two overlapped sub-cubes, prior to combining the filtered results from them. The overlapping of the sub-cubes may be beneficial in instances such as when otherwise there may be image kinks or un-smoothness near the sub-cube boundaries after combining the filtered results from sub-cubes. These image irregularities may be caused by the involvement of other image points in the filter design and application for an image point, although the range of involved points is limited or not great. Assuming that along a given dimension, the support size is Lsupp (in number of points) and patch size for filter design is Lpatch (in number of points), an exemplary overlapped size may be: Lovlp=Lsupp/2+Lpatch/2.

The aforementioned "taper" may be related to the "overlapped" sub-cubes. The taper may be a linearly decaying scalar applied in the overlapped zone of two adjacent image sub-cubes, prior to merging them. Along each dimension of an image sub-cube, a scalar may be applied linearly decaying outward the un-overlapped zone and toward the sub-cube boundary. For an overlapped length Lovlp, the decay rate or slope of the scalar is 1/(Lovlp+1) that can be obtained by assuming a scalar "1" just inside the un-overlapped zone and "0" just outside the sub-cube boundary.

The number of sub-cubes per image volume may vary depending on the sizes of image cube, sub-cube, and the overlapped zone. Specifically, the number of sub-cubes may be proportional to the image cube size and inversely proportional to the difference between the sub-cube and overlapped sizes. Taking X dimension as an example, a mathematical determination of the number of sub-cubes Nxsub along that dimension may be Nxsub=(Lxcub−Lxovlp+1)/(Lxsub−Lxovlp)+1, where Lxcub, Lxsub, and Lxovlp represent the sizes of image cube, sub-cube, and overlapped zone along X dimension, all in units of image point. Similarly, the numbers of sub-cubes along Y and Z dimensions, Nysub and Nzsub may be determined. Thus, the total number of sub-cubes can be Nsub=Nxsub·Nysub·Nzsub. An example size of a sub-cube is Lxsub·Lysub·Lzsub=101·101·101 (for example, in units of image points). Moreover, the number of image slices along a given dimension may depend on the size of a sub-cube and may simply equal the sub-cube size in that dimension. For example, if the sub-cube size along X dimension is 101, the number of image slices along X dimension may also be 101.

The distributed computing system can be a single workstation with multiple processors, or can be a cluster system including multi nodes or multiple computers. A distributed system with multiple nodes may be beneficial for pre-stack application with the input of many data volumes. However, in terms of a workstation or a cluster node that processes a data volume at one time, the computing power can be relatively high. Specifically, a relatively large number of processors can be employed to distribute and filter the sub-cubes of the data volume. This may provide efficiency advantages. The number of processors varies but, in one example, falls in the range 16-64. For instance, for 32 processors that a computing system has, the respective sub-cubes may be distributed (split, divided) among the 32 processors and efficiency can be improved ideally up to 32 times compared with a system of a single working processor.

Implementations of the present techniques are rooted in computer technology to address challenges of random noise attenuation and efficiency in seismic data processing. A 2D adaptive filter is unconventionally applied to a 3D seismic image. An innovative decomposition and parallel computation of the 3D seismic image data is distributed across multiple processors. As indicated throughout the discussion herein, the distributed computing system is improved both with respect to accuracy and efficiency of random noise attenuation of a seismic image.

The discussion below of certain embodiments of the present techniques is organized as follows. First, a work flow for filtering a 3D image volume is discussed. Such shows an exemplary split of the data volume for parallel computation and in applying a 2D filter to the 3D image space. Second, an exemplary process to filter an image slice is discussed. The image slice (2D image space) may generally be selected along any of the three image dimensions. Third, the design of a 2D adaptive filter is discussed.

FIG. 1 is a method 100 or workflow for filtering a 3D image volume (by utilizing a 2D adaptive filter). As for filtering procedures generally in seismic data processing, the input data may be assumed as a 3D ensemble of seismic traces. The two horizontal dimensions X and Y may represent the surface distribution of the traces, and the vertical dimension Z represents the position of trace samples in either time or depth. Embodiments herein assume that the ensemble is regularized in all three dimensions, thus forming a 3D image cube. The size of the 3D seismic image cube is typically significant and difficult to process directly as a whole. To handle this challenge efficiently with multi-processor computers, the 3D cube may be split into a series of overlapped sub-cubes, and the sub-cubes distributed to different processors for the filter processing. In certain implementations, each processing time for a processor only one sub-cube is processed by the processor, and the filtered sub-cube added to the final result after a taper being applied.

It is worth pointing out that the data splitting may be for the purpose of fulfilling parallel computation and reducing memory requirement, and generally not for achieving locality in the scope of sub-cube. For each image point inside a sub-cube, a different filter may be configured and applied. For better data stationarity inside a sub-cube, the image may be balanced by scaling the included seismic traces. After the filtering process is complete, trace de-scaling is applied to get the amplitude-level back.

Consider a trace inside the sub-cube as Equation (1) $a=[a_1, \ldots, a_L]^T$ where $a_l$ is the image amplitude at the $l^{th}$ sample and L is the trace length. The whole trace is scaled by a scalar as indicated in Equation (2) $c=1/\max(|a|)$. In this example, the scaled trace looks like Equation (3) $\tilde{a}=ca$. For de-scaling the same filtered trace, the inverse of c is simply used as the scalar to be applied.

In the method 100 of FIG. 1, an input image cube 102 is received and split (104) into multiple sub-cubes 106. As indicated at 108, each sub-cube 106 may be subjected to the listed actions depicted. The filtering of a respective sub-cube 106 may be implemented by one of the parallel processors 1 through K. In the illustrated embodiment, a processor k in that distribution of processors is shown as selected for one of the sub-cubes 106. At 110, the method obtains a sub-cube 106 from the multiple sub-cubes 106. As mentioned, the input image cube 102 may be split (block 104) into the multiple sub-cubes 106. At 112, the method scales the sub-cube 106. For example, the trace may be scaled as indicated in Equations (2) and (3) above.

At 114, the method decides whether to apply the filter on a slice in the X-dimension of the given sub-cube 106. If yes, the method applies (116) the filter on most or all X slices for that sub-cube 106. At 118, the method decides whether to apply the filter on a slice in the Y-dimension of the given sub-cube 106. If yes, the method applies (120) the filter on most or all Y slices for that sub-cube 106. At 122, the method decides whether to apply the filter on a slice in the Z-dimension of the given sub-cube 106. If yes, the method applies (124) the filter on most or all Z slices for that sub-cube 106.

The number of image slices along a given dimension may depend on the size of a sub-cube. In particular, the number may equal the sub-cube size in that dimension. For example, if the sub-cube size along X dimension is 101, the number of image slices along X dimension may also be 101.

The decisions 114, 118, 122 of "yes" or "no" for applying filter on the X slices, Y slices, and Z slices, respectively, can be correlated with image data quality, the noise level, similarity measures, and other factors. The selection of yes or no for filtering on image slices may depend on data distribution and quality. For example, it may be desirable that the data on a "yes" slice is evenly and densely distributed such that the similarity measurement between image patches for filter design can be fulfilled. The number (1, 2, or 3) of "yes" slice directions selected may also be decided by the data quality plus the additive effect of filter application on the three directions of image slices. If the noise level is relatively low or not very high, the method may deem application of the filter unnecessary on slices along all three dimensions. Indeed, the method may determine that only a selected number (1 or 2) of slice directions for filter application is adequate.

Of course, the method 100 may incorporate additional directions, dimensions, or planes with respect to filtering of 2D image slices. Lastly, once all of the sub-cubes have been filtered, the filter application of the sub-cubes as describe may end (132) and the method sum the filtering of the sub-cubes and output (134) a filtered cube 136.

Figure 2C:
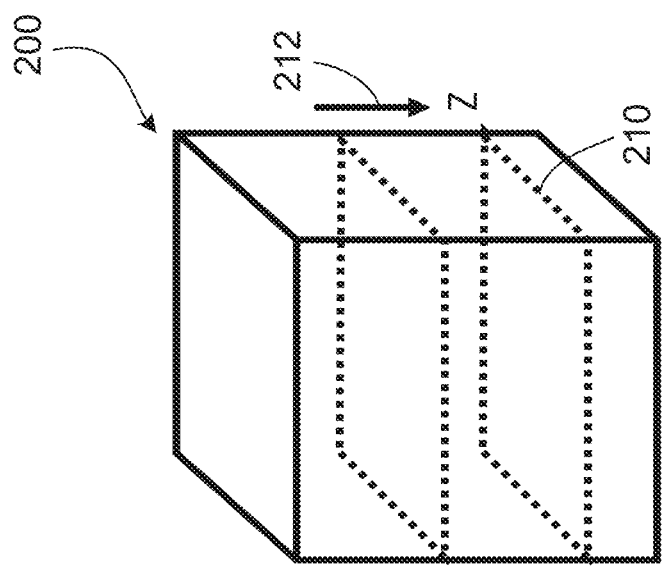
FIGS. 2A, 2B, and 2C are diagrams of a 3D sub-cube of a 3D image cube of seismic image data, depicting respective directions of 2D image slices (2D image spaces) of the 3D sub-cube.
Figure 2B:
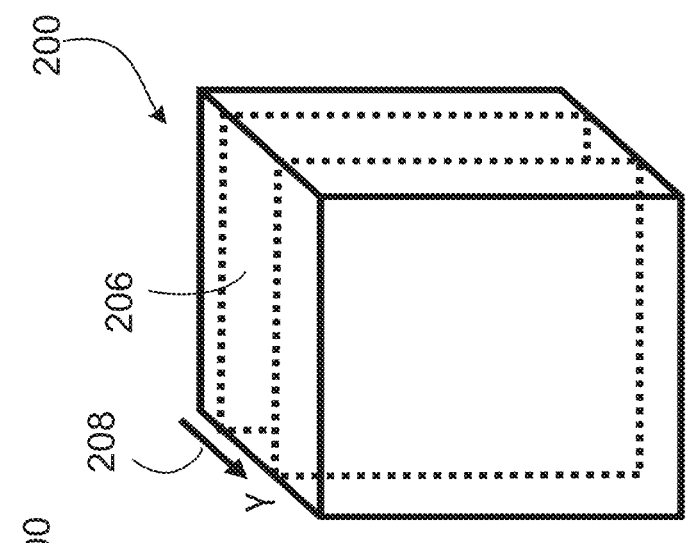
Figure 2A:
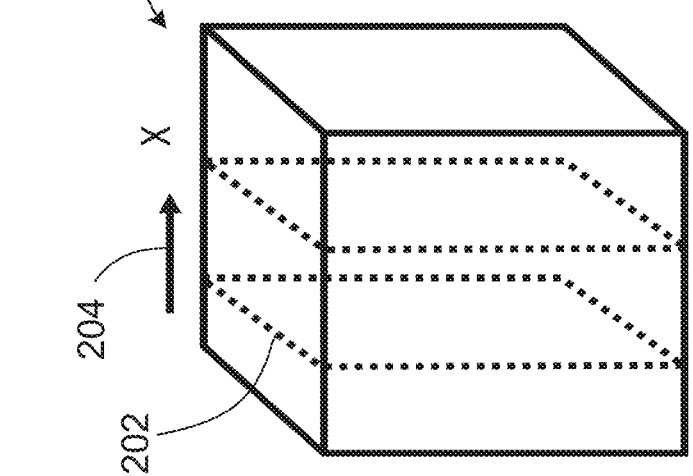

FIGS. 2A-2C indicate directions to apply the 2D adaptive filter to a 3D image sub-cube: (a) apply on constant X slices (Y-Z spaces), (b) apply on constant Y slices (X-Z spaces), and (c) apply on constant Z slices (X-Y spaces). To accommodate for the 2D nature of the adaptive filter, the filter is applied to the 2D image slices (2D image spaces) as discussed above, successively along the three image dimensions as shown in FIGS. 2A-2C.

FIG. 2A is a sub-cube 200 of 3D seismic image data. The depicted two image slices 202 in the x-direction 204 for filter application may be labeled as X slices 202. FIG. 2B is the sub-cube 200 with two image slices 206 in the y-direction 208 depicted for filter application. These slices in FIG. 2B may be labeled as Y slices 206. FIG. 2C is the sub-cube 200 with two image slices 210 in the z-direction 212 depicted for filter application. These slices in FIG. 2C may be labeled as Z slices 210.

Figure 3:
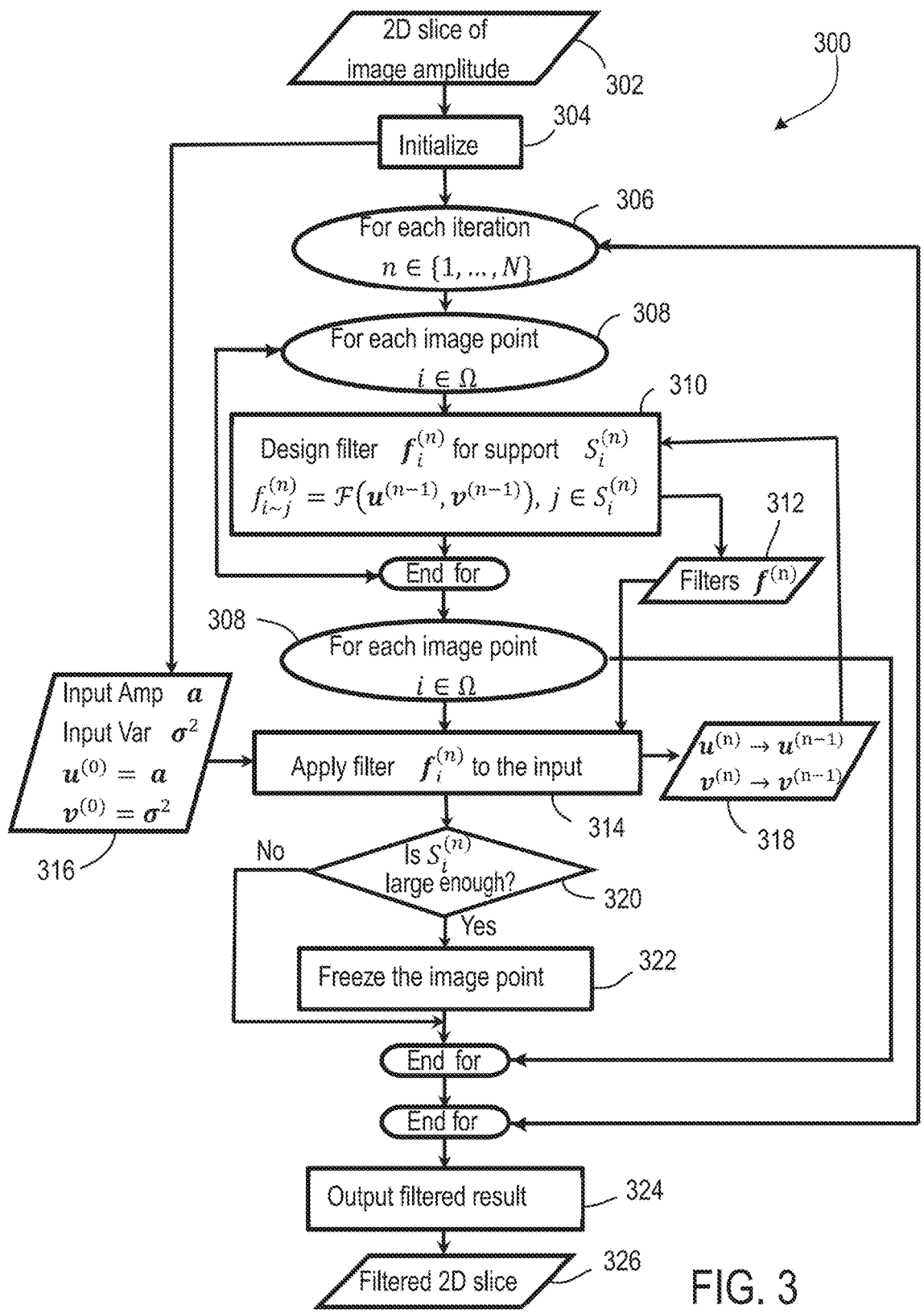
FIG. 3 is a block flow diagram of a method of filtering a 2D image space such as in the filtering in FIG. 1.

Based on, for example, the geometric distribution and signal-to-noise ratio of the input data, selected may be some or all application directions: constant X slice (Y-Z image space), constant Y slice (X-Z image space), and constant Z slice (X-Y image space). In certain embodiments, whatever the application direction, the iterative and adaptive filtering process may be the same. Examples of this adaptive filtering are discuss in more detail below. FIG. 3 addresses iterative and adaptive filtering for a 2D image space.

For a 2D image space $\Omega$ of $|\Omega|$ points, an iterative and adaptive filtering to attenuate random noise may be employed. In examples, the size of the filtering support increases with increasing iterations. Also, a different filter may be design or configured for each point in the image space, such as based on the local data structure in the support. In implementations, the technique utilizes a square support for the filtering. In this example, the support for a given iteration n (n=1, ..., N) and the current filtered point i (i=1, ..., $|\Omega|$) is denoted as $S_i^{(n)}$, where N is the maximum iteration. The support size can be expressed as Equation (4):

$$|S_i^{(n)}| = l^{(n)} \times l^{(n)} \qquad (4)$$

In Equation (4), $l^{(n)}$ is the filter length, in number of points, along each dimension of the square support. In this example, the filter length $l^{(n)}$ may be defined as in Equation (5) below:

$$l^{(1)}=3$$

$$l^{(n)}=l^{(n-1)}+2*(n-1), n>1 \qquad (5)$$

The method may assume that at a given iteration n, the vectors of filtered image amplitudes and their variances are given in Equation (6):

$$u^{(n)} = \left[u_1^{(n)}, \ldots, u_{|\Omega|}^{(n)}\right]^T \qquad (6)$$

$$v^{(n)} = \left[v_1^{(n)}, \ldots, v_{|\Omega|}^{(n)}\right]^T$$

In Equation (6) above, $u_i^{(n)}$ is the filtered image amplitude at point i, and $v_i^{(n)}$ is its variance. For initialization, the technique may consider a hypothetical iteration 0 with support size 1. The elements of the vectors $u^{(0)}$ and $v^{(0)}$ are assigned with the image amplitude $u_i^{(0)}$ and variance $v_i^{(0)}$ for the input data as in Equation (7):

$$u_i^{(0)}=a_i$$

$$v_i^{(0)}=(\sigma_i)^2 \qquad (7)$$

In Equation (7) above, $a_i$ is the input image amplitude and $\sigma_i$ is its standard deviation. In examples, the standard deviation can be estimated from local image residuals $r_i$ defined as in Equation (8):

$$r_i=(2a_{(i_1,i_2)}-a_{(i_1+1,i_2)}-a_{(i_1,i_2+1)})/\sqrt{2} \qquad (8)$$

In Equation (8) above, $a_{(i_1,i_2)}$ is the input image amplitude $a_i$ at point i, with $(i_1, i_2)$ representing its 2D location. In certain embodiments, to estimate local standard deviation, a collection of local residuals in a patch $p_i$ centered at image point i may be considered as in Equation (9):

$$r_{p_i}=[r_{p_i \sim 1}, \ldots, r_{p_i \sim |p_i|}]^T \qquad (9)$$

In Equation (9), $r_{p_i \sim k}$ is the kth residual in patch $p_i$, and $|p_i|$ is the patch size in number of image points. We use a rectangular patch, the same patch used for filter design (discussed in the next section). With this patch of local residuals, we can estimate the standard deviation as follows in Equation (10):

$$\sigma_{p_i}=1.4826\,\text{med}(||r_{p_i}|-\text{med}(|r_{p_i}|)|) \qquad (10)$$

To prevent an abnormally small value, the method may constrain the local standard deviation by the global one as noted in Equation (11):

$$\hat{\sigma}=1.4826\,\text{med}(||r|-\text{med}(|r|)|) \qquad (11)$$

In Equation (11) above, r is a collection of image residuals such as the collection of image residuals from the entire image space. Thus, the local standard deviation is defined as in Equation (12):

$$\sigma_i = \max(\sigma_{p_i}, \hat{\sigma}) \tag{12}$$

For a given iteration n, the technique configures a filter $f_i^{(n)}$ for each point i in the 2D image space. $f_i^{(n)}$ is a set of filter coefficients corresponding to the image points in the support $S_i^{(n)}$. The filter coefficient for image point j in the support can be expressed as follows in Equation (13):

$$f_{i-j}^{(n)} = \mathcal{F}(u^{(n-1)}, v^{(n-1)}), j \in S_i^{(n)} \tag{13}$$

Equation (13) says that the filter for iteration n is a function of the image amplitudes and variances estimated from the previous iteration (n−1). The detail for the filter configuration or design is presented below. The designed filter is applied to the input data to obtain the filtered image amplitude and variance, as indicated in Equation (14):

$$u_i^{(n)} = \Sigma_{j \in S_i^{(n)}} f_{i-j}^{(n)} a_j$$

$$v_i^{(n)} = \Sigma_{j \in S_i^{(n)}} (f_{i-j}^{(n)})^2 \sigma_j^2 \tag{14}$$

To avoid over-smoothed image and save computation time, we use a mechanism to freeze the support size and filtered result. This mechanism is localized, meaning that each image point is checked against a freezing criterion. Once an image point satisfies the criterion, the filtered image from the current iteration is frozen and used for the final result, and no more iterations will be run with larger support sizes. The freezing criterion is based on local smoothness and local bias of filtered image amplitudes between the current and previous iterations. Specifically, the maximum iteration applied to image point i is chosen as follows in Equation (15):

$$n_i = \min\{n=1, \ldots, N : (u_i^{(n)} - u_i^{(n-1)})^2 > \rho_2 v_i^{(n-1)}\} \tag{15}$$

In Equation (15), ρ is a positive constant. The criterion shown in Equation (15) means to select the smallest support that results in a large enough bias of the image amplitudes between two consecutive iterations, when compared with the local variance. This criterion agrees with the intuition that more image points involved in the filtering process, as the support size increases, tends to reduce noise, resulting in a smaller variance. At mean time, the enlarged support likely makes the filtered image amplitude more biased, because the remote points can come from other image contexts. For determining the constant ρ, an example includes Equation (16):

$$\rho \leq \hat{\rho} = \sqrt{2 \log \frac{N(N-1)}{1 - \#\{i \in \Omega : |r_i| \leq \hat{\sigma}\}/|\Omega|}} \tag{16}$$

In Equation (16), the quantity $\#\{i \in \Omega : |r_i| \leq \hat{\sigma}\}/|\Omega|$ represents the number of image points, in the 2D image space Ω, at which the local image residual $|r_i|$ is no greater than the global standard deviation $\hat{\sigma}$. In some examples, ρ can be determined as follows in Equation (17) below which may be a scaled and bounded version of $\hat{\rho}$:

$$\rho = \max(1.7, \min(\hat{\rho} \times 0.8, 2.0)) \tag{17}$$

FIG. 3 is a workflow or method 300 for filtering a 2D image space, as discussed above. The 2D slices 302 of image amplitude is received and initialized at 304. The support for a given iteration n (n=1, . . . , N) (at 306) and the current filtered point i (i=1, . . . , |Ω|) (at 308) is denoted as $S_i^{(n)}$, where N is the maximum iteration for a 2D image space Ω of |Ω| points. At 310, for each iteration 306 and each image point 308, a respective filter is designed for the given support as discussed above with respect to Equation (13) to output the multiple filters 312. The filter 312 for iteration n may be a function of the image amplitudes and variances estimated from the previous iteration (n−1). At 314, the filters 312 may be applied, respectively, for each image point 308. As indicated, the input 316 for the filtering process may be in regard to amplitudes and variances of the original image and discussed above with respect to Equation (14). Again, the design or configuration of the subsequent filter at 310 may be a function of the previous iteration, as indicated by 318.

For each iteration 306 and each image point 308, an iterative and adaptive filtering process is employed to attenuate random noise. The size of the filtering support increases with increasing iterations. Also, a different filter is designed for each point in the image space based on the local data structure in the support.

To avoid an over-smoothed image and save computation time, the technique may implement freezing of the support size and filtered result. If the method determines (at 320) that the size of the support increases to a threshold, the method may freeze (at 322) the image point. This mechanism may be localized, meaning that each image point is checked against a freezing criterion. Once an image point satisfies the criterion, the filtered image from the current iteration is frozen and used for the final result, and no more iterations will be run with larger support sizes. The filtered result is output (at 324) to give a filtered 2D slice 326.

Figure 4:
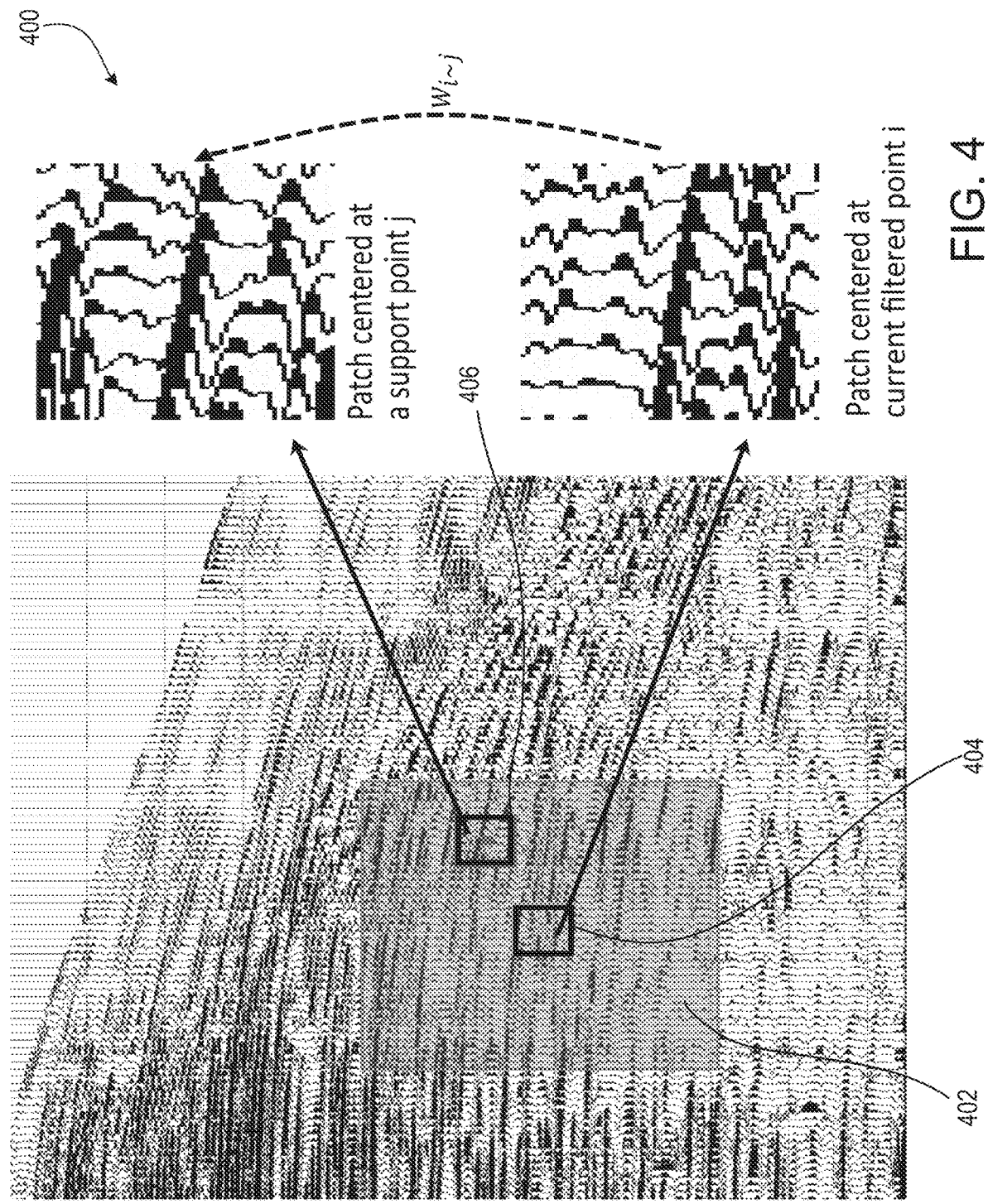
FIG. 4 is an illustration of a filter design process for a current filtered point and with a support area.

An example design of the 2D adaptive filter is now discussed. At a given iteration n and image point i, a filter is configured to fulfill the filtering process for noise attenuation. The filter design is on the square support $S_i^{(n)}$ centered at point i, and is to determine a weight $w_{i-j}^{(n)}$ for any point $j \in S_i^{(n)}$. The support size may be determined by Equations (4) and (5). FIG. 4 illustrates an exemplary filter design process.

A unique feature of the filter design is to make the weight adaptive to local data heterogeneity. This is done by measuring the similarity between two image patches $u_{p_i}^{(n-1)}$ and $u_{p_j}^{(n-1)}$ centered at the point i being filtered and support point j respectively. Either patch $u_{p_i}^{(n-1)}$ or $u_{p_j}^{(n-1)}$ is a vector of filtered image amplitudes from the previous iteration (n−1), with:

$$u_{p_i}^{(n-1)} = \left[ u_{p_{i\sim 1}}^{(n-1)}, \ldots, u_{p_{i\sim |P|}}^{(n-1)} \right]^T \tag{18}$$

$$u_{p_j}^{(n-1)} = \left[ u_{p_{j\sim 1}}^{(n-1)}, \ldots, u_{p_{j\sim |P|}}^{(n-1)} \right]^T$$

In equation (18), $u_{p_{i\sim k}}^{(n-1)}$ and $u_{p_{j\sim k}}^{(n-1)}$ (k=1, . . . , |P|) are the $k^{th}$ image amplitudes in patches $u_{p_i}^{(n-1)}$ and $u_{p_j}^{(n-1)}$, where |P| is the patch size in number of image points. The patch shape and size may affect the accuracy of the designed filter and computation efficiency. A rectangular patch with changeable side lengths may be applied. The technique may also allow to skip image points with a given decimation rate, along each side of the patch. It should be noted that for a given patch, the patch size may shrink at boundary areas of an image space. This is also true for the support size.

In examples, the Euclidean distance may be utilized to measure the similarity between two image patches, which can be generally reliable. The Euclidean distance computation may include the variances at two patch centers for normalization, and the sign of cross-correction for seismic polarity recognition. Thus, the Euclidean distance can be written as:

$$dist\left(u_{p_i}^{(n-1)}, u_{p_j}^{(n-1)}\right) = \frac{\left(u_{p_i}^{(n-1)} - \text{sign}\left(c_{p_i,p_j}^{(n-1)}\right)u_{p_j}^{(n-1)}\right)^T \left(u_{p_i}^{(n-1)} - \text{sign}\left(c_{p_i,p_j}^{(n-1)}\right)u_{p_j}^{(n-1)}\right)}{\left(v_i^{(n-1)} + v_j^{(n-1)}\right)/2} \quad (19)$$

In Equation (19), $v_i^{(n-1)}$ and $v_j^{(n-1)}$ are the local variances estimated at the current filtered point i and support point j, and $\text{sign}(c_{p_i,p_j}^{(n-1)})$ is the sign of the correlation coefficient $c_{p_i,p_j}^{(n-1)}$ between patches $u_{p_i}^{(n-1)}$ and $u_{p_j}^{(n-1)}$, with $c_{p_i,p_j}^{(n-1)}$ defined as:

$$c_{p_i,p_j}^{(n-1)} = (u_{p_i}^{(n-1)})^T u_{p_j}^{(n-1)} \quad (20)$$

For two patches with opposite polarities, the introduction of $\text{sign}(c_{p_i,p_j}^{(n-1)})$ can make them look similar. Moreover, with the distance or similarity defined in Equation (19), we determine the weight $w_{i \sim j}^{(n)}$ using the following Gaussian function, $$w_{i \sim j}^{(n)} = \text{sign}(c_{p_i,p_j}^{(n-1)}) \exp(-\text{dist}(u_{p_i}^{(n-1)}, u_{p_j}^{(n-1)})/2\lambda_\alpha) \quad (21)$$

In equation (21), $\lambda_\alpha$ is a scale parameter. It controls the decay rate of the weight against the distance. For a properly selected $\lambda_\alpha$, the weight decays rapidly with the distance due to the exponential kernel. Therefore, a support point is well accepted with a large weight, if two related patches $u_{p_i}^{(n-1)}$ and $u_{p_j}^{(n-1)}$ are similar and result in a small distance. On the other hand, a support point is rejected with a very small weight, if the two patches are not similar and result in a large distance.

The parameter $\lambda_\alpha$ can be chosen as a quantile of the chi-square distribution $\chi_{p,1-\alpha}^2$ with p degrees of freedom and probability $1-\alpha$ (Kervrann and Boulanger, 2008):

$$\mathbb{P}(\text{dist}(u_{p_i}^{(n-1)}, u_{p_j}^{(n-1)}) \leq \lambda_\alpha) = 1-\alpha \quad (22)$$

Equation (22) is the probability of incorrectly rejecting a support point whose patch $u_{p_j}^{(n-1)}$ is similar to the patch $u_{p_i}^{(n-1)}$. We choose $1-\alpha=0.99$. Moreover, as shown in Equation (21), the weight $w_{i \sim j}^{(n)}$ is not calculated from the original input data but from the filtered result estimated at the previous iteration. This is for improving the filter's robustness to noise. It can also be seen that the weight is symmetric with:

$$w_{i \sim j}^{(n)} = w_{j \sim i}^{(n)} \quad (23)$$

To take advantage of this symmetric property, the weights at most or all points in the 2D image space can be computed and saved before applying the weights to filter the data. Thus the filter design can be sped by avoiding redundant computation of the weights, although more memory may be employed to save the values of the weights. Finally, the weights may be normalized, such that the filtered result has the same amplitude level as the input. In examples, the normalized weight, or filter coefficient, is given by:

$$f_{i \sim j}^{(n)} = \frac{w_{i \sim j}^{(n)}}{\sum_{k \in s_i^{(n)}} |w_{i \sim k}^{(n)}|} \quad (24)$$

FIG. 4 is an illustration 400 of a filter design process for a current filtered point and with a support area 402. For any point j in the support area, its weight $w_{i \sim j}$ is calculated by measuring the similarity between two patches 404 and 406 centered at the image points i and j, respectively. Again, an innovative feature of the filter design is to make the weight adaptive to local data heterogeneity. As discussed, this may be accomplished in some implementations by measuring the similarity between two image patches $u_{p_i}^{(n-1)}$ and $u_{p_j}^{(n-1)}$ as discussed above.

As discussed, embodiments herein include a 2D local adaptive filter for random noise attenuation in 3D seismic data. A separate filter is employed for most or all considered image points, respectively, based on the local data arrangement, seismic data features, and filter symmetry. The support size or filter length may change based on local image data. As indicated, the iterative filtering may give increasing support sizes or filter lengths. This local adaptive filter may be applied to image slices sequentially along the three dimensions of an image volume to accommodate for the 2D nature of the filter and to increase efficiency. In any sub-cube decomposed from an image volume, the 2D adaptive filter is applied on the image slices consecutively along the three data dimensions in order to account for the 3D format of the seismic image. For parallelization, a 3D image volume is split into the overlapped sub-cubes which are distributed to different processors in a distributed computing system. Again, this domain decomposition strategy together with the image balancing inside a sub-cube can improve data stationarity. As mentioned, testing examples of the present techniques for both post-stack and pre-stack seismic data show significant suppression of random noise while preserving original features of seismic events.

In summary, certain examples of the present techniques for random noise attenuation in seismic image processing can apply (including to design or configure in application) a 2D local adaptive filter to 3D pre-stack and post-stack seismic data in a relatively straightforward and explicit manner. In some implementations, the filter in application is designed by comparing (for example, directly comparing) the similarities between a reference image patch at the point being filtered with patches at support points. The technique may incorporate seismic polarity information in the filter design to enhance the noise-reduction ability of the designed filter, and utilize the local variances at patch centers to increase the computation efficiency for the filter design. (As for local variances, some implementations utilize only local variances at patch centers.) The technique may thus apply the filter adaptive to the local data heterogeneity.

As indicated here and above with respect to Equation (19), seismic polarity may be considered. Negative and positive seismic polarities can respectively represent two opposite states of seismic media activated by passing seismic waves, for example, compression versus extension movement from a neutral state and vertical displacement below versus above a resting position. Such may be expressed as negative and positive amplitudes and displayed on opposite sides of zero-crossing on seismic records. Moreover, two records with opposite polarities may be considered to be dissimilar but can be made more similar, for example, by reversing one record's polarity with a scalar −1 applied.

The filter design efficiency may further be improved by utilization of the filter-coefficient symmetry in the scope of image space (for example, the whole image space). Also, as indicated, a locally variable support size (filter length) can be determined based on the local data statistics. Such determination of support size may be fulfilled through an iterative filtering process. Implementations apply the 2D adaptive filter on image slices, successively along the three dimensions of an image volume, with the number of slice directions (out of three) being selectable depending on the signal-to-noise ratio of the input data. Embodiments may generally decompose a 3D image volume into overlapped sub-cubes for the filtering process, in order to achieve processor-level parallelization and reduce memory requirement for image buffering and filter design. This data domain decomposition strategy, together with the image balancing applied inside an image sub-cube, can also improve the data stationarity that can be beneficial to success for the filtering process.

Figure 5:
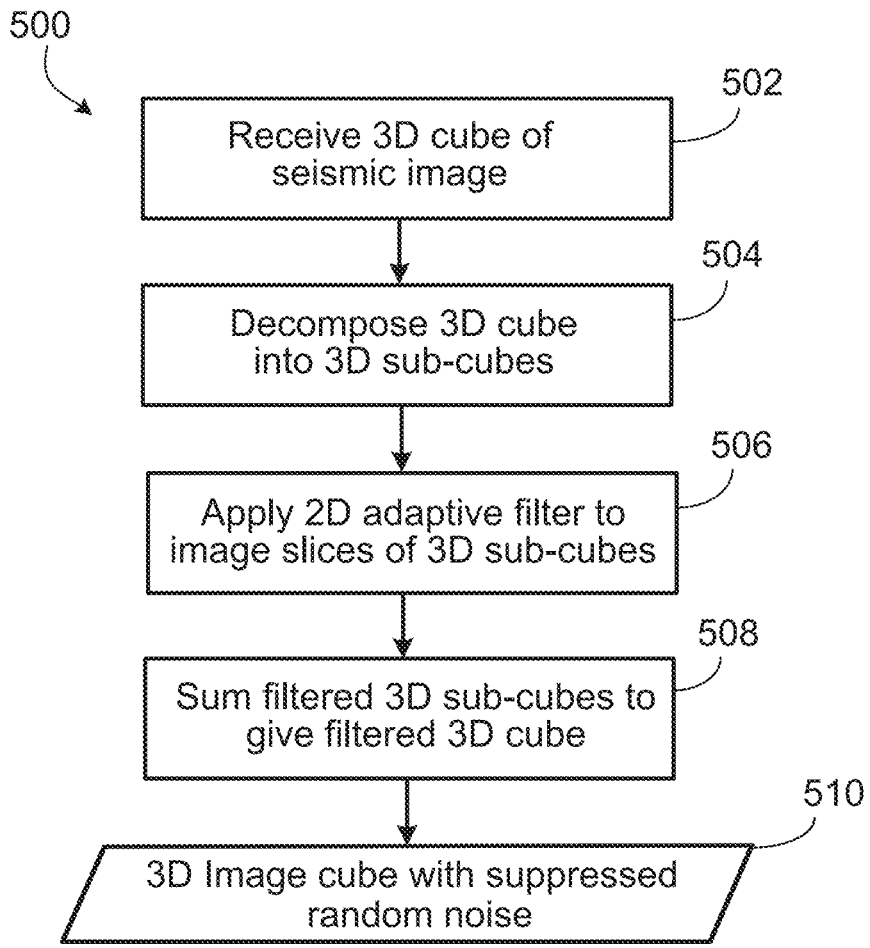
FIG. 5 is a block flow diagram of a computer-implemented method for seismic data processing including processing 3D seismic data for random noise attenuation of a seismic image.

FIG. 5 is a computer-implemented method 500 for seismic data processing. In particular, the method 500 is a method of processing three-dimensional (3D) seismic data including random noise attenuation of a seismic image. The method may be applied to 3D pre-stack and post-stack seismic data, and other seismic data. The method may be implemented via a computing system having a processor and memory storing code (instructions, logic, etc.) executed by the processor. The computing system may be a distributed computing system having parallel processors or nodes. The innovative computing system via the executed code may implement the actions 502, 504, 506, 508, and 510 of method 500 listed in FIG. 5. The method 500 can provide random noise attenuation to reduce noise while generally preserving original image features. The method 500 can be applied to large image volumes with multi-processor computers.

At block 502, the method includes receiving a 3D cube of a seismic image (seismic image data). The seismic image may be a 3D ensemble of seismic traces. The three dimensions may include, for example, two horizontal dimensions X and Y representing the surface distribution of the traces, and a vertical dimension Z representing the position of trace samples in either time or depth. Some embodiments assume that the ensemble is regularized in all three dimensions, thus forming a 3D image cube. The size of the 3D seismic image cube may be relatively large and therefore problematic to process as a whole in certain implementations.

At block 504, the method includes decomposing the 3D cube into 3D sub-cubes. Such may be performed in preparation for filtering the 3D image volume of the 3D cube. The decomposition may be a split of the data volume of the 3D cube for parallel computation to apply a 2D filter to the 3D image space. For a distributed computing system or multi-processor computers, the 3D cube may be split into a series of overlapped sub-cubes, and the sub-cubes distributed to different processors for the filter processing. In some examples, a given node or processor is assigned to process only a single sub-cube at a time before being assigned to process another single sub-cube. In certain implementations, the data splitting is to fulfill parallel computation and reduce memory requirement, and generally not for achieving locality in the scope of sub-cube. In particular examples, the parallel computation may reduce memory demand for image buffering and filter design associated with applying a 2D adaptive filter. In summary, the decomposing (block 504) of the 3D image volume (3D cube) into overlapped sub-cubes for the subsequent filtering may be to achieve parallel computation (processor-level parallelization), improved data stationarity, and reduced memory requirement for image buffering and filter design. This data domain decomposition strategy, together with the subsequent image balancing applied inside an image sub-cube at block 506, can also improve the data stationarity which can be advantageous to the filtering.

At block 506, the method includes applying a 2D adaptive filter to 2D image slices of the 3D sub-cubes. As indicated for some examples, each processing time for a processor involves only one sub-cube. An exemplary process to filter image slices is discussed above with respect to the preceding figures. The image slices (2D image space) may generally be selected along the three aforementioned image dimensions X, Y, and Z, or other designated dimensions. The number of slice dimensions or directions (for example, out of three) selected may depend on the signal-to-noise ratio of the input data. Indeed, the signal-to-noise ratio or other factors may be employed in various techniques to select 1, 2, or 3 dimensions. In some cases, a quantitative criterion is not employed (or primarily employed) to select the number of slice dimensions to apply the 2D adaptive filter for noise attenuation. Instead, the selection may be performed, for example, qualitatively by testing. For instance, with a relatively small but representative amount of data in the input dataset, the method may start and filter the data with a slice direction wherein the image slices have a substantially even and dense data distribution. If the signal-to-noise ratio on the filtered result looks acceptable, the method may apply only this slice direction for the whole input dataset. If not, the technique may add a slice direction and re-do the filtering job. This testing technique may be repeated until the signal-to-noise ratio looks acceptable or all three slice directions have been applied. Of course, other techniques for selecting 1, 2, or 3 dimensions may be employed.

The method may apply the local adaptive filter to image slices, successively along the three dimensions of an image volume, in order to accommodate for the 2D nature of the filter and increase efficiency of the filtering. For each image point inside an image slice of a sub-cube, a different filter may be configured (designed) and applied. In general, prior to the filtering, image balancing may be applied inside the sub-cubes from the image volume decomposition of block 504. Indeed, the image inside a sub-cube may be balanced by scaling the included seismic traces to improve data stationarity which may be beneficial to the filtering.

In the iterations of the filtering process, the filter may be designed at least in part by comparing the similarities between a reference image patch at the point being filtered and the patches at support points. An image patch may be a collection of image points confined in an area marked out from the whole image area. A patch may typically be defined for the central image point in the area, and all the image points in the patch employed to statistically present the characteristics (for example, smoothness) at this central point.

The term support may be similar to the term patch in the sense of being a collection of image points but support is specific for image filtering. Filtering is generally to compute the weighted summation of input image amplitudes in a predefined area, yielding the filtered output at some point (usually central point) in the area. The image points contributing (or supporting) the summation are the so called support points, and thus the area containing all the support points is called support. The number of support points is the support size. Also, the collection of weights applied at the support points for the summation computation may be the so-called filter, with weights themselves being filter coefficients. The number of filter coefficients can be labeled as filter length that equals the support size.

The filter adaptable design (configuration) may incorporate seismic polarity to enhance the noise-reduction of the designed filter, and use the local variances at patch centers to improve the computation efficiency for the filter design. The filter may thus be iteratively designed in implementation as adaptive to the local heterogeneity. Indeed, as indicated here and throughout the present discussion such as with respect to Equation (18), local data heterogeneity can be considered. Data heterogeneity may mean the variation of data characteristics with locations, for example, the variation of waveform (closely related to frequency and phase) and smoothness with sample locations, in the case of seismic data. The filter design efficiency can be further improved by utilization of the filter-coefficient symmetry in the scope of the whole image space. Also, a locally variable support size (filter length) may be determined based on the local data statistics, which can be fulfilled through an iterative filtering process.

In summary, the local adaptive filter may be designed specifically for each image point based on the local structure and characteristics of seismic data. The locality and adaptability of the filter can promote noise reduction while preserving original signal features. The application may include determining the support size (filter length) based on local image statistics, such as through iterative filtering. The support size and the estimated (filtered) image at an image point can be frozen at an iteration in response to satisfying a given criterion. This variable support size can avoid over-smoothed image and save computation time in some implementations. After the filtering is complete, trace de-scaling may be applied to regain the amplitude-level.

In some examples, the method may utilize the symmetric property of the filter coefficients to improve the efficiency for the filter design. Exemplary filter coefficients are discussed throughout including with respect to Equations (13) and (19). Filter-coefficient symmetry may mean that the filter coefficients are equal or substantially equal when the filtered point and a support point are swapped. See, for example, Equation (23). Plainly, the symmetric property is generally not among the support points for a given filtered point. In other words, the symmetry is typically not in the scope of support. Instead, the symmetry considered is in the scope of whole image space wherein each image point plays the role of both filtered point and support point. Moreover, filter coefficients may be the weights applied to support points for filtering that computes the filtered result at a filtered point by weighed summation of inputs at the support points for the filtered point.

At block 508, the method includes summing the filtered 3D sub-cubes to give a filtered 3D image cube 510 in which random noise is suppressed. Each filtered sub-cube may be added to the final result, for example, after a taper is applied to each filtered sub-cube. The filtered 3D cube 510 may provide for suppressed or reduced noise while preserving original signal features. The filtered 3D cube 510 (including in conjunction with other filtered 3D cubes) may be relied on to interpret the structures of subsurface formations in order to locate likely locations of hydrocarbon deposits.

Figure 6:
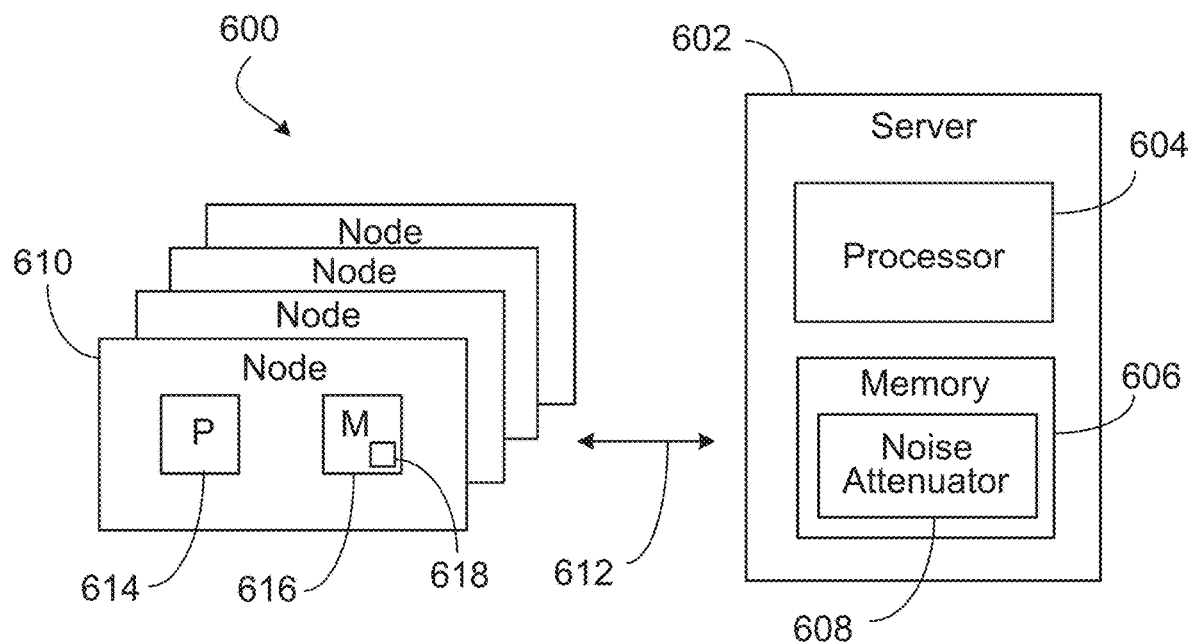
FIG. 6 is a block diagram of a distributed computing system for random noise attenuation of a seismic image.

FIG. 6 is a distributed computing system 600 with a computer server 602 having a hardware processor 604 and memory 606. The processor 604 may be more than one processor or may have multiple cores. The memory 606 stores a random noise attenuator 608 for the distributed computing system 600 to implement techniques disclosed herein. The random noise attenuator 608 may facilitate execution of compute jobs on the distributed computing system 600 for the seismic data processing discussed with respect to the preceding figures. The random noise attenuator 608 is code (instructions, logic, etc.) executed by the processor 604, multiple nodes 610, or other processors, or any combinations thereof.

The distributed computing system 600 may include multiple nodes 610 including compute nodes. The number of nodes 610 may be, for example, 2, 4, 8, 16, 32, 64, 100, 1000, 10,000, 60,000, 200,000, or greater. The server 602 is generally coupled with the compute nodes 610, as indicated by arrow 612. The nodes 610 each include a hardware processor 614 and memory 616. In certain implementations, random noise attenuator 608 code may be distributed across (stored in) memory 616 on the nodes 610.

The processors 604 and 614 may be a microprocessor, a central processing unit (CPU), and the like. Moreover, a graphics processing unit (GPU) or general purpose GPU (GPGPU) may be associated with the processors 604 and 614. The memory 606 and 616 may include non-volatile memory (for example, hard drive, read-only memory or ROM, flash memory, cards, etc.), volatile memory (for example, random access memory or RAM, cache, etc.), firmware, and other types of memory. In some examples, the node memory 616 may be cache memory associated with the processor 614 and may include additional memory types.

As indicated, the computing system 600, via its random noise attenuator 608 and multiple processors 604 and 614, may process 3D seismic data (pre-stack and post-stack) including implementing random noise attenuation of a seismic image. In operation, the computing system 600 may decompose (divide, split) a 3D cube of a seismic image data into 3D sub-cubes (for example, overlapped sub-cubes) and distribute the 3D sub-cubes in parallel across the nodes 610 or processors 614 for filter processing. The filter processing on each node 610 may involve application of the 2D adaptive filter discussed above. In some examples, a node processor 614 filters one 3D sub-cube at a time. The computing system 600 via the random noise attenuator 608 may sum the filtered 3D sub-cubes to give a filtered 3D cube having suppressed or reduced noise, as attenuated.

The distributed computing system 600 may be in a datacenter or disposed across multiple geographic locations. In some examples, the computing system 600 is a single workstation with the multiple nodes 610 as multiple processors within or associated with the workstation. Embodiments of the present techniques are rooted in computer technology in order to overcome problems of random noise attenuation and efficiency specifically arising in seismic data processing. An innovative 2D adaptive filter is unconventionally applied to a 3D seismic image. A unique decomposition and parallel computation of the 3D seismic image data is implemented. The new 2D filter of the random noise attenuator is adaptive at least with regard to incorporating local heterogeneity. As discussed above, the distributed computing system is improved both with respect to accuracy and efficiency of random noise attenuation of a seismic image. The computer is improved with regard to data stationarity and reduced memory requirement for image buffering and filter design/configuration.

Figure 7:
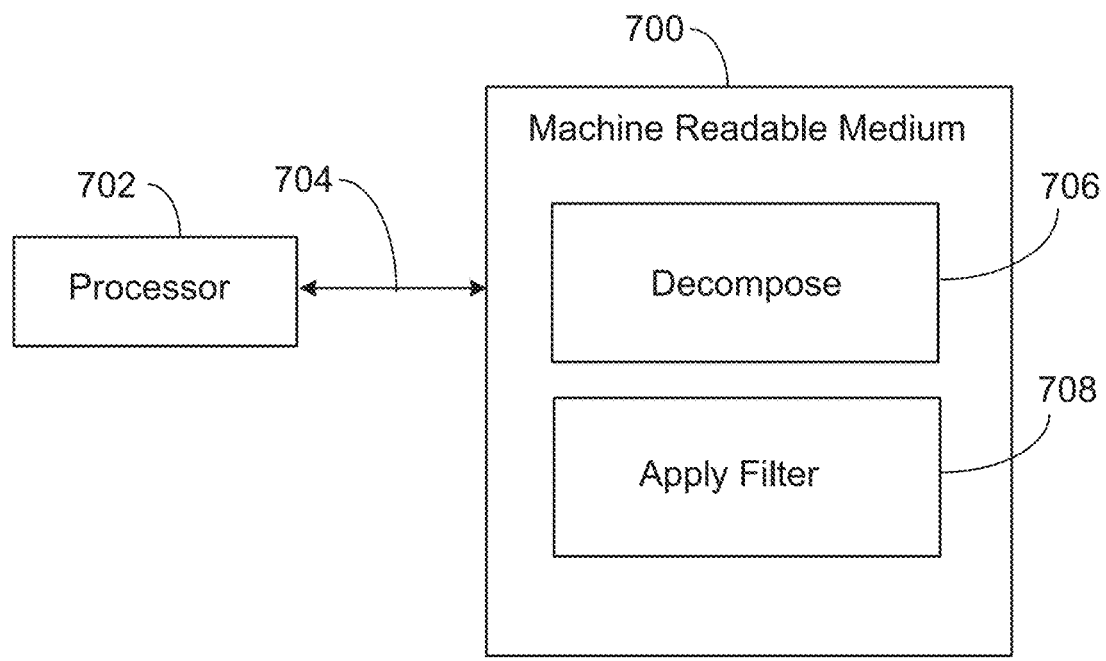
FIG. 7 is a block diagram of a tangible, non-transitory, computer-readable medium that can facilitate random noise attenuation of a seismic image.

FIG. 7 is a block diagram depicting a tangible, non-transitory, computer (machine) readable medium 700 to facilitate noise attenuation of a seismic image as disclosed herein. The computer-readable medium 700 may be accessed by a processor 702 over a computer interconnect 704. The processor 702 may be a server processor, a compute-node processor, a workstation processor, a distributed-computing system processor, a remote computing device processor, or other processor. The tangible, non-transitory computer-readable medium 700 may include executable instructions or code to direct the processor 702 to perform the operations of the techniques described herein, such as to filter a seismic mage for random noise attenuation. The various executed code components discussed herein may be stored on the tangible, non-transitory computer-readable medium 700, as indicated in FIG. 7. For example, a decompose code 706 may include executable instructions to direct the processor 702 to decompose a 3D cube of seismic image data into overlapped 3D sub-cubes and distribute the 3D sub-cubes respectively across multiple processors for 2D filter processing. Apply filter code 708 may include executable instructions to direct the processor 702 or the multiple processors to apply a 2D adaptive filter to the 3D sub-cubes, as discussed above. It should be understood that any number of additional executable code components not shown in in FIG. 7 may be included within the tangible non-transitory computer-readable medium 700 depending on the application.

In summary, an embodiment is a method of seismic image processing including filtering a 3D seismic image for random noise attenuation via a distributed computing system having multiple processors. The filtering includes receiving a 3D image cube of seismic image data of the 3D seismic image, decomposing the 3D image cube into 3D sub-cubes for parallel computation on the multiple processors, applying a 2D adaptive filter to 2D image slices of the 3D sub-cubes via the multiple processors to give filtered 3D sub-cubes, and summing the filtered 3D sub-cubes to give a filtered 3D image cube. The seismic image data may be or include a 3D ensemble of seismic traces, having three dimensions including two horizontal dimensions representing a surface distribution of the seismic traces and a vertical dimension representing position of the seismic trace samples in time or depth. In examples, the 3D ensemble is at least partially regularized in the three dimensions forming the 3D image cube, wherein decomposing the 3D image cube into 3D sub-cubes comprises dividing the 3D image cube into overlapped 3D sub-cubes, and wherein a support size comprising filter length of the 2D adaptive filter is variable based on local image statistics. The method may include determining a support size or filter length of the 2D adaptive filter based on local image statistics through iterative filtering, wherein the 2D image slices for applying the 2D filter comprise 2D image slices in at least one of a first horizontal dimension direction, a second horizontal dimension direction, or the vertical dimension direction. In implementations, applying the 2D adaptive filter includes iteratively designing the 2D adaptive filter for image points, respectively, inside a 3D sub-cube of the 3D sub-cubes. The decomposing the 3D image cube may involve assigning to a processor of the multiple processors the applying of the 2D adaptive filter to the 3D sub-cube, and wherein iteratively designing comprises iteratively designing the 2D adaptive filter based on local data structure. In embodiments, the processor applies the 2D adaptive filter to only one 3D sub-cube at a time, and wherein applying the 2D adaptive filter comprises utilizing a symmetric property of filter coefficients of the 2D adaptive filter.

Another embodiment is a method of filtering, via a distributed computing system, a 3D seismic image for random noise attenuation. The method includes receiving a 3D image cube of seismic data of the 3D seismic image wherein the 3D seismic image comprises input data that is a 3D ensemble of seismic traces. The method includes decomposing the 3D image cube into 3D sub-cubes for parallel computation on multiple processors of the distributed computing system, and applying a 2D adaptive filter to 2D image slices of the 3D sub-cubes to give filtered 3D sub-cubes. Further, the method includes summing the filtered 3D sub-cubes to give a filtered 3D image cube, wherein the filtered 3D image cube is the 3D image cube minus random noise. The summing of the filtered 3D sub-cubes may involve applying a taper to the filtered 3D sub-cubes. The summing of the filtered 3D sub-cubes may also involve applying trace de-scaling to the filtered 3D sub-cubes to regain amplitude-level. The method may rely on the filtered 3D cube to interpret structures of subsurface formations to locate hydrocarbon deposits.

Moreover, the applying of the 2D adaptive filter may involve iteratively designing the 2D adaptive filter as adaptive to local data heterogeneity. The filtering may include scaling seismic traces, and wherein iteratively designing the 2D adaptive filter includes comparing a reference image patch at an image point being filtered to a patch at a support point. Moreover, the applying of the 2D adaptive filter may include employing a separate respective 2D filter for each considered image point in a 3D sub-cube, and with filter design based on local data structure. The designing of the 2D adaptive filter may rely on local variances at patch centers, seismic polarity, and utilizing filter-coefficient symmetry in scope of an image space. Further, the applying of the 2D adaptive filter may involve adjusting filter length of the 2D adaptive filter correlative with local image statistics.

Yet another embodiment is a distributed computing system including multiple processors for filtering 3D seismic image data to suppress random noise. The distributed computing system includes a random noise attenuator to: decompose a 3D image cube of the 3D seismic image data into 3D sub-cubes for parallel computation on the multiple processors; apply a two-dimensional (2D) adaptive filter to 2D image slices of the 3D sub-cubes via the multiple processors to give filtered 3D sub-cubes; and sum the filtered 3D sub-cubes to give a filtered 3D image cube. The filtered 3D image cube may be the 3D image cube without random noise suppressed by the distributed computing system. The distributed computing system may have memory storing the random noise attenuator, wherein the random noise attenuator is the code executed by a processor of the distributed computing.

To apply the 2D adaptive filter may include to determine a locally variable filter length based on local data through iterative filtering. The 2D adaptive filter may include a local adaptive filter designed iteratively for respective image points based on local structure and characteristics of the seismic image data, and wherein the 2D adaptive filter is adaptable to seismic polarity and local variances at patch centers. The 2D adaptive filter may include multiple respective 2D filters comprising a respective 2D filter for each considered image point in a 3D sub-cube, and with filter configuration based on local data structure. In some cases, the 2D adaptive filter is iteratively designed in implementation as adaptive to local data heterogeneity.

Yet another embodiment is a non-transitory, computer-readable medium storing instructions executable by a processor of a computing device to filter 3D seismic image data for random noise attenuation by applying a 2D adaptive filter to 2D image spaces of a 3D seismic image cube of the 3D seismic image data, wherein the 2D adaptive filter includes a 2D local adaptive filter iteratively designed in application based on local data structure. In implementations, the instructions executable by the processor split the 3D seismic image cube into a series of overlapped 3D sub-cubes for distribution to multiple processors for parallel computation of filtering, and wherein applying the 2D adaptive filter to 2D image spaces includes applying the 2D adaptive filter to 2D image spaces of the overlapped 3D sub-cubes. In implementations, to apply the 2D adaptive filter includes applying a different design of the 2D adaptive filter for two considered image points, respectively, in an overlapped sub-cube, and with filter configuration based on local data structure. In implementations, the 2D adaptive filter is iteratively designed respectively for each considered image point inside an overlapped 3D sub-cube of the overlapped 3D sub-cubes, and wherein only one overlapped 3D sub-cube is filter processed by a given processor at a time.

A number of implementations have been described. Nevertheless, it will be understood that various modifications may be made without departing from the spirit and scope of the disclosure.

EXAMPLES

The following two examples are illustrative of the present techniques but are not meant to limit the present techniques. The two examples are two field-data examples to illustrate exemplary behavior of the proposed techniques for random noise attenuation by a local adaptive filter. The executed code includes C++ programming language implemented as a module (labeled Adaptive Random-Noise Attenuation or ARNA) in an Echos® seismic data processing system. The module passed a User Acceptance Test. The User Acceptance Test promotes that a released module is adequate for production and qualified to be part of the Echos® seismic data processing system. The criteria for a module passing the test include: (1) effectiveness of the module in demonstrating the asserted functionalities and accuracy; (2) efficiency of the module in having an acceptable turnaround time for typical dataset sizes in production; (3) stability without crashes due to software bugs and module shortages; and (4) applicability in being able to fit to a variety of encountered hardware configurations, data types, and dataset sizes.

Figures 8A, 8B:
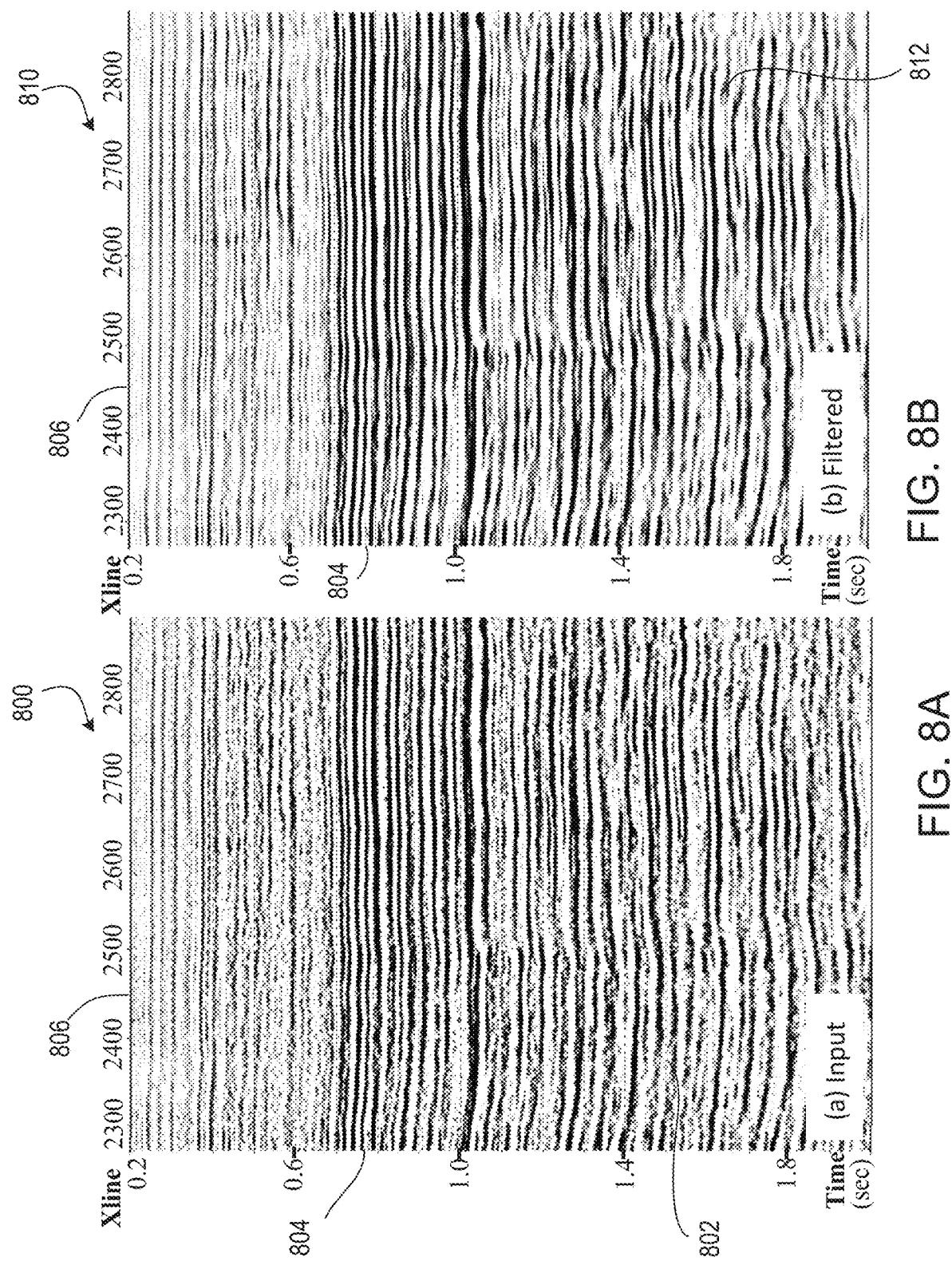
FIGS. 8A, 8B, and 8C are diagrams of seismic images illustrating Example 1.
Figure 8C:
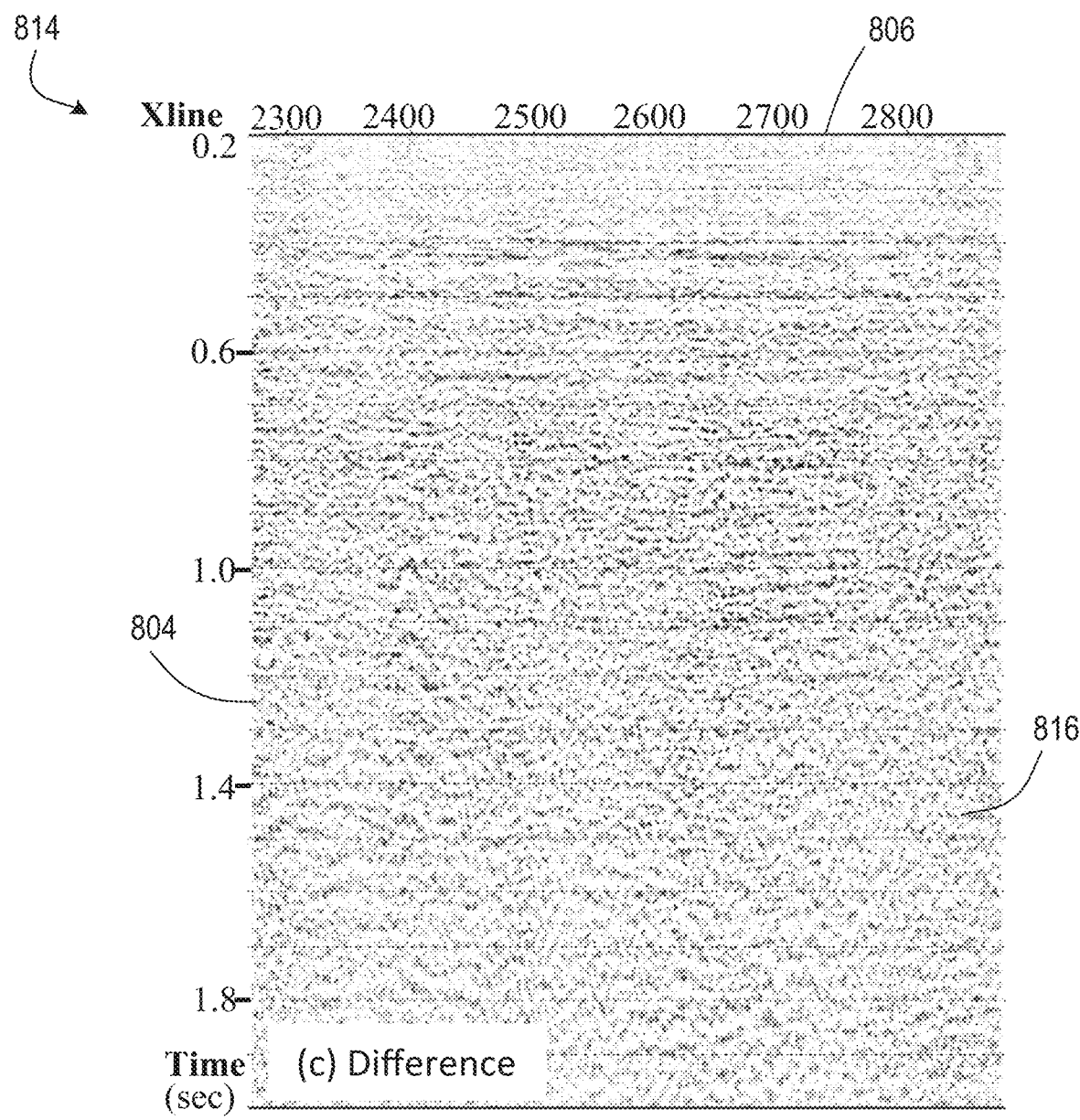

The first example is applied to post-stack data and is presented with respect to FIGS. 8A-8C. The second example is applied to pre-stack data and is presented with respect to FIGS. 9A-9C. These two examples demonstrate exemplary effectiveness of the present techniques.

Example 1

The first example, as illustrated in FIGS. 8A-8C, is a post-stack data example application for seismic random-noise attenuation by a 2D local adaptive filter. FIG. 8A depicts a portion of one inline from an input post-stack volume. FIG. 8B depicts the corresponding filtered result. FIG. 8C is the difference between the input data and filtered result. The first example is applied to a 3D post-stack seismic volume. FIG. 8A is a portion of a seismic image 800 of one inline 802 from an input volume of the 3D post-stack seismic volume. The data is contaminated significantly by random noise.

Time here is the vertical dimension (Z) among the three (two horizontal X and Y plus one vertical Z) dimensions of an image volume. The two horizontal dimensions (X and Y) are xline and inline, respectively. The selection of time as the vertical (Z) dimension has been discussed above. An inline (constant-Y) image slice is displayed. The reference numeral 802 on the whole image slice for the dimension inline (Y) is noted because the whole slice is on a constant inline.

For this post-stack data, the two horizontal dimensions X and Y are defined to be xline 806 and inline 802, and the vertical dimension Z is defined to be travel time 804 of seismic waves. In this example, only two directions for applying the 2D adaptive filter are selected: on constant X (xline) slices and constant Y (inline) slices. The maximum number of iterations is 3, with the filter length (side length of the square support) being 3, 5, and 9 for each iteration, respectively. A square patch is employed for filter design. Each side of the patch spans 9 image points that are decimated by 2. FIG. 8B is the filtered result 810 corresponding to the input data in FIG. 8A. The filtered image 812 demonstrates that noise was attenuated resulting in improved visibility and continuity for seismic events. Original image features, contrasts, and edges are preserved. FIG. 8C is an image depiction 814 showing the difference 816 between the input data (FIG. 8A) and the filtered image result (FIG. 8B), which represents the noise component removed. The difference is displayed with the same scale as that for the input data and filtered result. The example removes pure noise and with little coherent signal touched.

Example 2

Figures 9A, 9B:
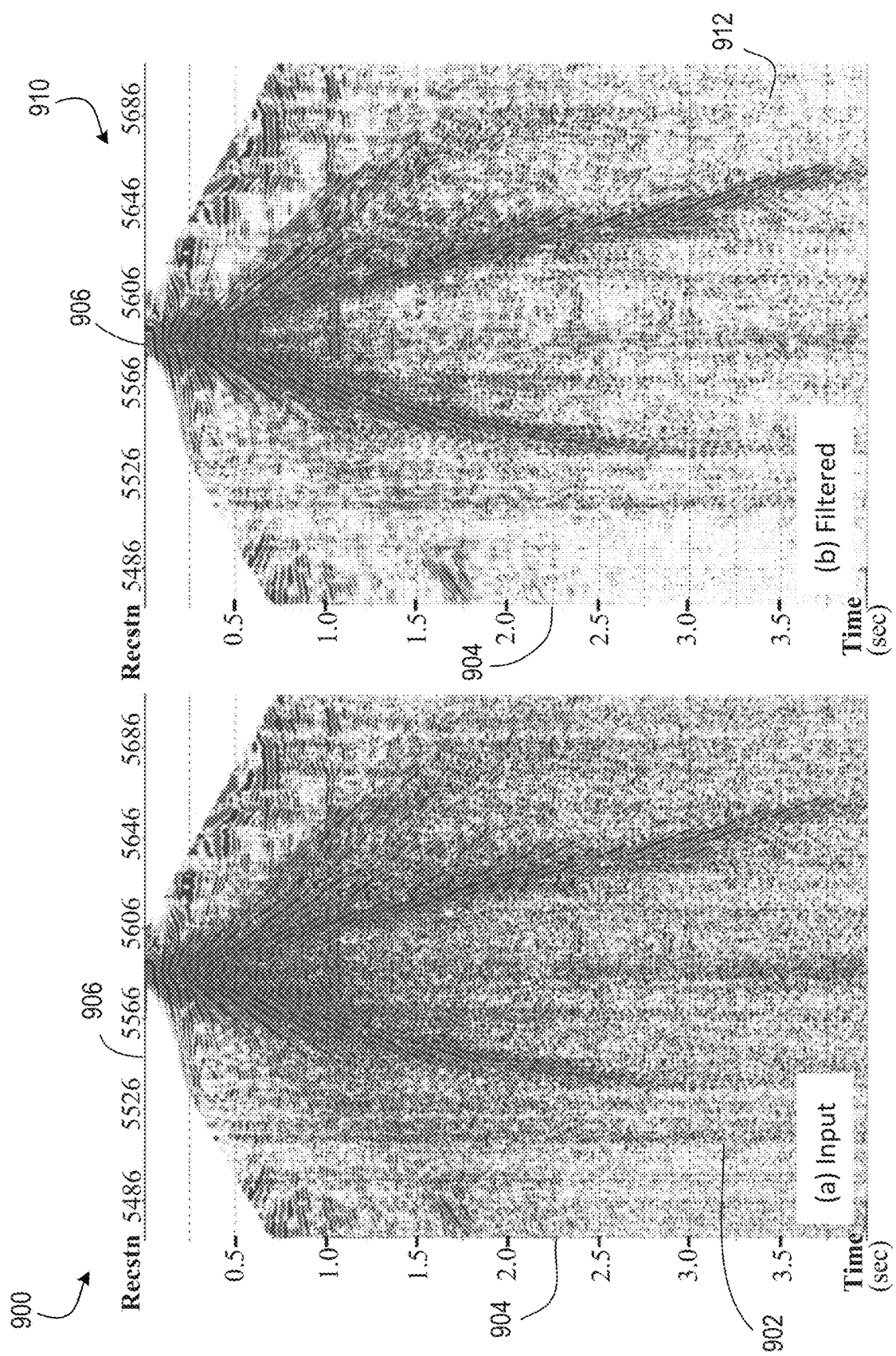
FIGS. 9A, 9B, and 9C are diagrams of seismic images illustrating Example 2.
Figure 9C:
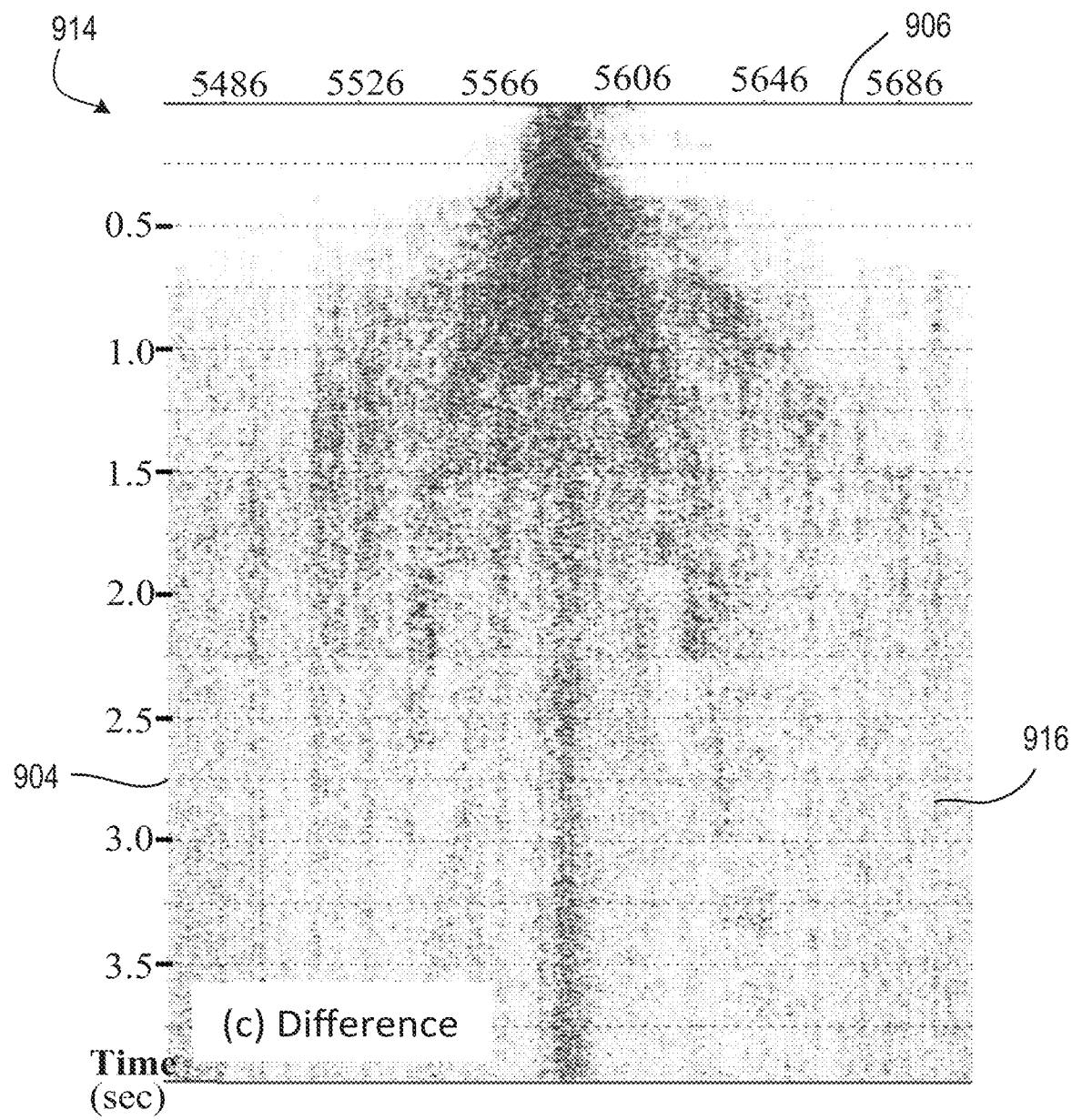

The second example, as illustrated in FIGS. 9A-9C, is a pre-stack data example application of the present techniques for seismic random noise attenuation by a local adaptive filter. FIG. 9A is a portion of seismic image of cross-spread gather. FIG. 9B is the corresponding filtered result. FIG. 9C is the difference between the input data and filtered result. The second example is applied to a pre-stack gather in the cross-spread domain. The cross spread means that all receivers locate on one line, while all shots locate on another perpendicular line. The receivers are identified by receiver stations, and shots by shot lines. The cross-spread gather consists of seismic traces recorded by all or some of the receivers for each shot. FIG. 9A shows a portion of the cross-spread gather 900 corresponding to a shot with specific shot line 902. To process this pre-stack gather, defined are the two horizontal dimensions X and Y to be receiver station 906 and shot line 902, and the vertical dimension Z to be travel time 904. As with the first example, the adaptive filter is applied on the constant X (receiver station) slices and constant Y (shot line) slices, and the filtering process is run 3 iterations at maximum. Also, a square patch is employed for filter design, with side length spanning 9 image points and decimated by 2. FIG. 9B is an image depiction 910 of the filtered result 912 corresponding to the input data in FIG. 9A. The receiver and shot positions for the input gather are not perfectly or fully regularized. Therefore, the regularized data desired by embodiments of the present techniques is not fully satisfied. Nevertheless, the example performed well, as shown by the filtered result 912. The data is cleaned significantly, especially near the tip of the ground-roll cone. As a result, some reflections are better shown. FIG. 9C is an image depiction 914 of the difference 916 between the input data (FIG. 9A) and filtered result (FIG. 9B), which is displayed with the same scale as that for the input data and filtered result. Again, in this example, the greatest part of the removed component is of random nature. Only little coherent signal can be noticed on and near the edges of the ground-roll cone, where the image amplitude is very high.

What is claimed is:

1. A method of seismic image processing comprising:
  filtering a three-dimensional (3D) seismic image for random noise attenuation via a distributed computing system comprising multiple processors, the filtering comprising:
    receiving a 3D image cube of seismic image data of the 3D seismic image, wherein the seismic image data comprises a 3D ensemble of seismic traces, the 3D ensemble comprising three dimensions including two horizontal dimensions representing a surface distribution of the seismic traces and a vertical dimension representing position of seismic trace samples in time or depth;
    decomposing the 3D image cube into 3D sub-cubes for parallel computation on the multiple processors;
    applying a two-dimensional (2D) adaptive filter to 2D image slices of the 3D sub-cubes via the multiple processors to give filtered 3D sub-cubes, the filter being adaptive in two dimensions while holding a third dimension constant for each of three dimensions of the 3D sub-cubes, wherein the 2D image slices comprise 2D image slices of the 3D sub-cubes in at least one of a first horizontal dimension direction, a second horizontal dimension direction, or the vertical dimension, wherein applying the 2D adaptive filter comprises iteratively adapting the 2D adaptive filter for image points, respectively, inside a 3D sub-cube of the 3D sub-cubes by performing operations comprising, for a given 2D slice:
      determining a filter length for the two dimensions of the 2D adaptive filter based on at least one local image statistic; and
      applying the 2D adaptive filter having the filter length to the 2D image slices of the 3D sub-cubes; and
    summing the filtered 3D sub-cubes to give a filtered 3D image cube; and
  based on the filtered 3D image cube, determining a location of a hydrocarbon deposit.

2. The method of claim 1, wherein the 3D ensemble is at least partially regularized in the three dimensions forming the 3D image cube, wherein decomposing the 3D image cube into 3D sub-cubes comprises dividing the 3D image cube into overlapped 3D sub-cubes.

3. The method of claim 1, wherein applying the 2D adaptive filter comprises iteratively designing the 2D adaptive filter for image points, respectively, inside a 3D sub-cube of the 3D sub-cubes.

4. The method of claim 3, wherein decomposing the 3D image cube comprises assigning to a processor of the multiple processors the applying of the 2D adaptive filter to the 3D sub-cube, and wherein iteratively designing comprises iteratively designing the 2D adaptive filter based on local data structure.

5. The method of claim 3, wherein the processor applies the 2D adaptive filter to only one 3D sub-cube at a time, and wherein applying the 2D adaptive filter comprises utilizing a symmetric property of filter coefficients of the 2D adaptive filter.

6. A method of filtering, via a distributed computing system, a three-dimensional (3D) seismic image for random noise attenuation, comprising:
  receiving a 3D image cube of seismic data of the 3D seismic image wherein the 3D seismic image comprises input data that is a 3D ensemble of seismic traces, the 3D ensemble comprising three dimensions including two horizontal dimensions representing a surface distribution of the seismic traces and a vertical dimension representing position of seismic trace samples in time or depth;
  decomposing the 3D image cube into 3D sub-cubes for parallel computation on multiple processors of the distributed computing system;
  applying a two-dimensional (2D) adaptive filter to 2D image slices of the 3D sub-cubes to give filtered 3D sub-cubes, wherein the 2D image slices comprise 2D image slices of the 3D sub-cubes in at least one of a first horizontal dimension direction, a second horizontal dimension direction, or the vertical dimension;
  applying a two-dimensional (2D) adaptive filter to 2D image slices of the 3D sub-cubes via the multiple processors to give filtered 3D sub-cubes, the filter being adaptive in two dimensions while holding a third dimension constant for each of three dimensions of the 3D sub-cubes, wherein the 2D image slices comprise 2D image slices of the 3D sub-cubes in at least one of a first horizontal dimension direction, a second horizontal dimension direction, or the vertical dimension, wherein applying the 2D adaptive filter comprises iteratively adapting the 2D adaptive filter for image points, respectively, inside a 3D sub-cube of the 3D sub-cubes by performing operations comprising, for a given 2D slice:
    determining a filter length for the two dimensions of the 2D adaptive filter based on at least one local image statistic; and
    applying the 2D adaptive filter having the filter length to the 2D image slices of the 3D sub-cubes;
  summing the filtered 3D sub-cubes to give a filtered 3D image cube, wherein the filtered 3D image cube comprises the 3D image cube minus random noise; and
  based on the filtered 3D image cube, determining a location of a hydrocarbon deposit.

7. The method of claim 6, wherein applying the 2D adaptive filter comprises iteratively designing the 2D adaptive filter as adaptive to local data heterogeneity.

8. The method of claim 7, wherein the filtering comprises scaling seismic traces, and wherein iteratively designing the 2D adaptive filter comprises comparing a reference image patch at an image point being filtered to a patch at a support point.

9. The method of claim 6, wherein applying the 2D adaptive filter comprises employing a separate respective 2D filter for each considered image point in a 3D sub-cube, and with filter design based on local data structure.

10. The method of claim 6, wherein applying the 2D adaptive filter comprises relying on local variances at patch centers, relying on seismic polarity, and utilizing filter-coefficient symmetry in scope of an image space.

11. The method of claim 6, wherein applying the 2D adaptive filter comprises adjusting filter length of the 2D adaptive filter correlative with local image statistics, and wherein summing the filtered 3D sub-cubes comprises applying a taper to the filtered 3D sub-cubes.

12. The method of claim 6, comprising relying on the filtered 3D cube to interpret structures of subsurface formations to locate hydrocarbon deposits, wherein summing the filtered 3D sub-cubes comprises applying trace de-scaling to the filtered 3D sub-cubes to regain amplitude-level.

13. A distributed computing system for filtering three-dimensional (3D) seismic image data to suppress random noise, comprising:

multiple processors; and a random noise attenuator to:

decompose a 3D image cube of the 3D seismic image data into 3D sub-cubes for parallel computation on the multiple processors, wherein the 3D seismic image comprises input data that is a 3D ensemble of seismic traces, the 3D ensemble comprising three dimensions including two horizontal dimensions representing a surface distribution of the seismic traces and a vertical dimension representing position of seismic trace samples in time or depth;

apply a two-dimensional (2D) adaptive filter to 2D image slices of the 3D sub-cubes via the multiple processors to give filtered 3D sub-cubes, the filter being adaptive in two dimensions while holding a third dimension constant for each of three dimensions of the 3D sub-cubes, wherein the 2D image slices comprise 2D image slices of the 3D sub-cubes in at least one of a first horizontal dimension direction, a second horizontal dimension direction, or the vertical dimension, wherein applying the 2D adaptive filter comprises iteratively adapting the 2D adaptive filter for image points, respectively, inside a 3D sub-cube of the 3D sub-cubes by performing operations comprising, for a given 2D slice:

determining a filter length for the two dimensions of the 2D adaptive filter based on at least one local image statistic; and applying the 2D adaptive filter having the filter length to the 2D image slices of the 3D sub-cubes;

sum the filtered 3D sub-cubes to give a filtered 3D image cube; and based on the filtered 3D image cube, determining a location of a hydrocarbon deposit.

14. The distributed computing system of claim 13, comprising memory storing the random noise attenuator, wherein the random noise attenuator comprises code executable by a processor of the distributed computing.

15. The distributed computing system of claim 13, wherein the 2D adaptive filter is designed iteratively for respective image points based on local structure and characteristics of the seismic image data, and wherein the 2D adaptive filter is adaptable to seismic polarity and local variances at patch centers.

16. The distributed computing system of claim 13, wherein the 2D adaptive filter comprises multiple respective 2D filters comprising a respective 2D filter for each considered image point in a 3D sub-cube, and with filter configuration based on local data structure.

17. The distributed computing system of claim 13, wherein the 2D adaptive filter is iteratively designed in implementation as adaptive to local data heterogeneity, and wherein the filtered 3D image cube comprises the 3D image cube without random noise suppressed by the distributed computing system.

18. A non-transitory, computer-readable medium comprising instructions executable by a processor of a computing device, the instructions configured to cause the processor to filter three dimensional (3D) seismic image data for random noise attenuation by performing operations comprising:

applying a two-dimensional (2D) adaptive filter to 2D image slices of a 3D seismic image cube of the 3D seismic image data to give filtered 3D sub-cubes, the filter being adaptive in two dimensions while holding a third dimension constant for each of three dimensions of the 3D sub-cubes, wherein the 2D image slices comprise 2D image slices of the 3D sub-cubes in at least one of a first horizontal dimension direction, a second horizontal dimension direction, or a vertical dimension, wherein applying the 2D adaptive filter comprises iteratively adapting the 2D adaptive filter for image points, respectively, inside a 3D sub-cube of the 3D sub-cubes by performing operations comprising, for a given 2D slice:

determining a filter length for the two dimensions of the 2D adaptive filter based on at least one local image statistic; and applying the 2D adaptive filter having the filter length to the 2D image slices of the 3D sub-cubes; and summing the filtered 3D sub-cubes to give a filtered 3D image cube; and based on the filtered 3D image cube, determining a location of a hydrocarbon deposit.

19. The non-transitory, computer-readable medium of claim 18, wherein the instructions executable by the processor split the 3D seismic image cube into a series of overlapped 3D sub-cubes for distribution to multiple processors for parallel computation of filtering, and wherein applying the 2D adaptive filter to 2D image spaces comprises applying the 2D adaptive filter to 2D image spaces of the overlapped 3D sub-cubes.

20. The non-transitory, computer-readable medium of claim 19, wherein to apply the 2D adaptive filter comprises applying a different design of the 2D adaptive filter for two considered image points, respectively, in an overlapped sub-cube, and with filter configuration based on local data structure.

21. The non-transitory, computer-readable medium of claim 19, wherein the 2D adaptive filter is iteratively designed respectively for each considered image point inside an overlapped 3D sub-cube of the overlapped 3D sub-cubes, and wherein only one overlapped 3D sub-cube is filter processed by a given processor at a time.

* * * * *